(12) United States Patent
Bolskar et al.

(10) Patent No.: US 7,208,132 B2
(45) Date of Patent: Apr. 24, 2007

(54) PURIFICATION OF ENDOHEDRAL AND OTHER FULLERENES BY CHEMICAL METHODS

(75) Inventors: Robert D. Bolskar, Boulder, CO (US); J. Michael Alford, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 384 days.

(21) Appl. No.: 10/263,374

(22) Filed: Oct. 1, 2002

(65) Prior Publication Data

US 2003/0157016 A1    Aug. 21, 2003

Related U.S. Application Data

(60) Provisional application No. 60/326,307, filed on Oct. 1, 2001.

(51) Int. Cl.
    *C01B 31/00* (2006.01)
(52) U.S. Cl. .................. 423/461; 423/445 B; 977/845
(58) Field of Classification Search ............ 423/445 B, 423/461; 977/845
    See application file for complete search history.

(56) References Cited

U.S. PATENT DOCUMENTS

| 6,303,016 | B1 | 10/2001 | Diener et al. ............... 205/687 |
| 6,517,799 | B2 | 2/2003 | Alford et al. ............... 423/445 |
| 2003/0065206 | A1 | 4/2003 | Bolsker et al. ............... 558/87 |

OTHER PUBLICATIONS

Akasaka, T. et al. (Web published Sep. 7, 2000), "La@$C_{82}$ Anion. An Unusually Stable Metallofullerence," *J. Am. Chem. Soc.*, 122:9316-9317.
Akasaka, T. et al. (Mar. 2000), "Isolation and characterization of two Pr@$C_{82}$ isomers," *Chem. Phys. Lett.* 319:153-156.
Akasaka, T. et al. (Web published Mar. 24, 2001), "Structural Determination of the La@$C_{82}$ Isomer," *J. Phys. Chem. B.*, 105:2971-2974.
Anderson, M. R. et al. (1997), "The Voltammetry of $Sc_3$ @$C_{82}$," *J. Am. Chem. Soc.* 119:437-438.
Beer, F. et al. (1997), "High-Yield Reactive Extraction of Giant Fullerenes from Soot," *J. Mater. Chem.*, 7:1327-1330.
Bethune, D. S. et al. (1993), "Atoms in carbon cages: the structural and properties of endohedral fullerenes," *Nature* 366:123-128.
Bolskar, R.D. et al. (Apr. 2003), "First Soluble M@$C_{60}$ Derivatives Provide Enhanced Access to Metallofullerenes and Permit in Vivo Evaluation of GD@$C_6[C(COOH)_2]_{10}$ as a MRI Contrast Agent," *J. Am. Chem. Soc.* 125(8):5471-5478.
Bolskar, R. D. et al. (1996), "Synthesis and Isolation of a Fullerene Carbocation ($C_{76}^+$)," *J. Am. Chem. Soc.* 118:13093-13094.
Bolskar, R. D. (1997), "The Synthesis and Characterization of Fullerene Anion and Cation Salts," Ph.D. Dissertation, University of Southern California, Los Angeles, CA, 238 pp.
Boudon, C. et al. (1998), "Redox Characteristics of Covalent Derivatives of the Higher Fullerenes $C_{70}$, $C_{76}$, and $C_{78}$," *J. Am. Chem. Soc.* 120:7860-7868.
Cagle, D. W. et al. (1999), "*In vivo* studies of fullerene-based materials using endohedral metallofullerene radiotracers," *Proc. Natl. Acad. Sci. USA* 96:5182-5187.
Connelly, N. G.; Geiger, W. E. (1996), "Chemical Redox Agents for Organometallic Chemistry," *Chem. Rev.*, 96:877-910.
Diederich, F. et al. (1991) "The Higher Fullerenes: Isolation and Characterization of $C_{76}$, $C_{84}$, $C_{90}$, $C_{94}$, and $C_{70}O$, and Oxide of $D_{5h}$-$C_{70}$" *Science* 252:548-551.
Diederich, F. and Whetten, R.L. (1992), "Beyond $_{60}$: The Higher Fullerenes," Acc. Chem. Res. 25:119-126.
Diener, M. D. et al. (1997), "Anaerobic Preparation and Solvent-Free Separation of Uranium Endohedral Metallofullerenes," *Chem. Mater.* 9:1773-1777.
Diener, M. D.; Alford, J. M. (1998), "Isolation and properties of small-bandgap fullerenes" *Nature* 393:668-671.
Hirsch, A. (1994)(a). *The Chemistry of the Fullerenes*, Georg Thieme Verlag Stuttgart, New York.
Hirsch, A. (1999), "Principles of Fullerene Reactivity," in *Topics in Current Chemistry*, vol. 199, Springer Verlag, Berlin, Heidelberg, pp. 1-65.
Huang, Y. et al. (1991), "Externally Bound Metal Ion Complexes of Buckminster Fullerene, $MC60^+$ in the Gas Phase," J. Am. Chem. Soc. 113:9418-9418.
Kikuchi, K. et al. (1993), "Isolation and characterization of the metallofullerene $LaC_{82}$," *Chem. Phys. Lett.* 216:67-71.
Kitagawa, T. et al. (1999), "Electrophilic Addition of Polychloroalkanes to $C_{60}$: Direct Observation of Alkylfullerenyl Cation Intermediates," *J. Am Chem. Soc.* 121:4298-4299.
Krätschmer, W. et al. (1990), "Solid $C_{60}$: a new form of carbon," *Nature* 347:354-358.
Kubozono, Y. et al. (1996), "Extractions of Ca@$C_{60}$ and Sr@$C_{60}$ with Aniline," *Chem. Lett.*pp. 453-454.
Kubozono, Y. et al. (1995), "Preparation and Extraction of Ca @$C_{60}$," Chem. Lett., pp. 457-458.
Kubozono, Y. et al. (1996), "Extractions of Y@$C_{60}$, Ba@$C_{60}$, La@$C_{60}$, Ce@ $C_{60}$, Pr@$C_{60}$, Nd@$C_{60}$, and Gd@$C_{60}$ with Aniline," *J. Am. Chem. Soc.*, 118:6998-6999.
Lui, B. (Sep. 1998), "High efficient extraction of M@$C_{2n}$ (M—La, Ce) by a high pressure and high temperature method," Tetrahedron 54:11123-11128.

(Continued)

*Primary Examiner*—Stuart Hendrickson
(74) *Attorney, Agent, or Firm*—Greenlee, Winner and Sullivan, P.C.

(57) ABSTRACT

The invention provides a method of separating a first and a second set of fullerenes in a fullerene mixture. In the method of the invention, a stable fullerene cation is formed of one of the first or the second set of fullerenes. The fullerene cation is then separated from the other set of fullerenes. Optionally, the fullerene cation may be returned to its neutral state. The method of the invention is particularly useful for the purification and separation of endohedral fullerenes from empty fullerenes. However, the method may be applied to the purification of a broad range of endohedral and empty fullerene materials.

36 Claims, 15 Drawing Sheets

OTHER PUBLICATIONS

Liu, S.; Sun, S. (Apr. 9, 2000), "Recent progress in the studies of endohedral metallofullerenes" *J. Organomet. Chem.* 599:79-86.

Nagase, S. et al. (1996), "Endohedral Metallofullerenes: New Spherical Cage Molecules with Interesting Properties," *Bull. Chem. Soc. Jpn.* 69:2131-2142.

Nagase, S. et al. (Jul. 2000) "Endohedral Metallofullerenes: Theory, Electrochemistry, and Chemical Reactions," in *Fullerenes: Chemistry, Physics, and Technology*, Kadish, K. M. and Ruoff, R. S. eds., John Wiley & Sons, New York, pp. 395-436.

Ogawa, T. et al. (Web Published Mar. 22, 2000). "Isolation and Characterization of Er@$C_{60}$," *J. Am. Chem. Soc.* 122:3538-3539.

Okazaki, T. et al. (Apr. 14, 2000), "Isolation and spectroscopic characterization of Sm-containing metallofullerenes," *Chem. Phys. Lett.* 320:435-440.

Parker, D. H. et al. (1991). "High-Yield Synthesis, Separation, and Mass-Spectrometric Characterization of Fullerenes $C_{60}$ to $C_{266}$," *J. Am. Chem. Soc.* 113:7499-7503.

Reed, C. A. (1998), "Carboranes: A New Class of Weakly Coordinating Anions for Strong Electrophiles, Oxidants, and Superacids," *Acc. Chem. Res.* 31:133-139.

Reed, C. A.; Bolskar, R. D. (Web published Feb. 16, 2000), "Discrete Fulleride Anions and Fullerenium Cations," *Chem. Rev.* 100:1075-1120.

Reed, C. A. et al. (Jul. 7, 2000), "Taming Superacids: Stabilization of the Fullerene Cations $HC_{60}^+$ and $C_{60}^+$," *Science*: 289:101-104.

Ruoff, R. S. et al. (1993), "Solubility of $C_{60}$ in a Variety of Solvents," *J. Phys. Chem.* 97:3379-3383.

Selegue, J. P. et al. (1994), "Purification and Characterization of the Larger Fullerenes: New Aspects of $C_{76}$, $C_{78}$ and $C_{84}$," in *Recent Advances in the Chemistry and Physics of Fullerenes and Related Materials*; Kadish, K. M.; Ruoff, R. S., Eds.; The Electrochemical Society Inc., Pennington, NJ, USA, pp. 1274-1291.

shinohara, H. et al. (1993) "Isolation and Spectroscopic Properties of $Sc_2@C_{74}$, $Sc_2@C_{82}$, and $Sc_2@C_{84}$," *J. Phys. Chem.* 97:4259-4261.

Shinohara, H. (Jun. 2000), "Endohedral metallofullerenes," *Rep. Prog. Phys.* 63:843-892.

Stevenson, S. et al. (1999), "Small-bandgap endohedral metallofullerenes in high yield and purity," *Nature* 401:55-57.

Strauss, S. H. (1993), "The Search for Larger and More Weakly Coordinating Anions," *Chem. Rev.* 93:927-942.

Sun, D. et al. (1999), "A Simple Method for the Selective Enrichment of Endohedral Metallofullerenes," *Chem. Mater.* 11:374-377.

Suzuki, T. et al. (1995), "Electrochemistry and Ab Initio Study of the Dimetallofullerene $La_2@C_{80}$," *Angew. Chem. Int. Ed. Engl.* 34(10):1094-1096.

Suzuki, T. et al. (1996), "Electrochemical Properties of Fullernolanthanides" *Tetrahedron* 52(14):4973-4982.

Tagmatarchis, N. et al. (Web published Jul. 11, 2001). "Novel Singlet Oxygen Generators: The Nature and the Number of Trapped Metal Atoms in Endohedral Metallofullerenes M@$C_{82}$ (M + Dy, Gd, La) and Dy2@$C_{2n}$ (2n + 84-94)," *Phys. Chem. Chem. Phys.*, 3:3200-3202.

Tso, T. S. C. et al. (1996), "Solid Phase Extraction as a Simple Method for the Enrichment of Endohedral Metallofullerenes," *Tetrahedron Lett.* 37:9249-9252.

Tumanskii, B. L. et al. (1998), "EPR Study of Reactivity of Endohedral Metallofullerenes La@$C_{82}$ and Y@$C_{82}$," *Full. Sci. and Tech.* 6:445-451.

Unknown (Jun. 1993), "Separation of fullerenes by electrophoresis," IBM Tech. Dis. Bull., No. 6A, pp. 55-56.

Wei, X.-W. et al. (Published online Aug. 15, 2001). "The Remarkable Stable Emerald Green $C_{60}F_{15}[CBr(CO_2Et)_2]_3$: The First [60] Fullerene That Is Also the First [18] Trannulene," *Angew. Chem. Intl. Ed.* 40:2989-2992.

Wharton, T. et al. (Avail. online Jul. 6, 2001). "New Non-Ionic, Highly Water-Soluble Derivatives of $C_{60}$ Designed for Biological Compatibility," *Tet. Lett.* 42:5159-5162.

Wilson, S. R. et al. (Jul. 2000)(b). "Organic Chemistry of Fullerenes," in *Fullerenes: Chemistry, Physics, and Technology*, Kadish, K. M. and Ruoff, R. S. eds., John Wiley & Sons, New York, 91-176.

Xiao, J. et al. (1994), "Efficient HPLC Purification of Endohedral Metallofullerenes on a Porphyrin-Silica Stationary Phase," *J. Am. Chem. Soc* 116:9341-9342.

Xie, Q. et al. (1992), "Electrochemical Detection of $C_{60}^{6-}$ and $C_{70}^{6-}$: Enhanced Stability of Fullerides in Solution," *J. Am. Chem. Soc.* 114:3978-3980.

Xie, Q. et al. (1993), "Electrochemically-Reversible, Single-Electron Oxidation of $C_{60}$ and $C_{70}$," *J. Am. Chem. Soc.* 115:9818-9819.

Yamamoto, K. et al. (1994), "Isolation of an ESR-Active Metallofullerene of La@$C_{82}$," *J. Phys. Chem.* 98:2008-2011.

Yang, Y. et al. (1995), "Reversible Fullerene Electrochemistry: Correlation with the HOMO-LUMO Energy Difference for $C_{60}$, $C_{70}$, $C_{76}$, $C_{78}$, and $C_{84}$," *J. Am. Chem. Soc.* 117:7801-7804.

Yeretzian, C. et al. (1993). "Partial Separation of Fullerenes by Gradient Sublimation," *J. Phys. Chem.* 97:10097-10101.

Cox et al., "The 'Special' Behavior of C60 and Large Carbon Clusters," J. Chem. Phys. vol. 88, No. 3, pp. 1588-1597 Feb. 1, 1998.

PURIFICATION OF ENDOHEDRAL AND OTHER FULLERENES BY CHEMICAL METHODS

CROSS-REFERENCE TO RELATED APPLICATIONS

The present application claims priority to U.S. provisional application Ser. No. 60/326,307, filed Oct. 1, 2001, which is incorporated herein by reference in its entirety.

STATEMENT REGARDING FEDERALLY SPONSORED RESEARCH OR DEVELOPMENT

This invention was made with U.S. Government support under National institutes of Health (NIH) Contract No. 5R44CA066363-03. The Government has certain rights in this invention.

BACKGROUND OF THE INVENTION

This invention relates to purification of fullerenes, especially endohedral fullerenes, by chemical methods.

At the present time, endohedral fullerenes are available in much smaller quantities than the empty fullerenes. The major production method used to generate macroscopic quantities of empty fullerenes and endohedral fullerenes is the carbon-arc discharge method first revealed by Krätschmer and Huffman (Krätschmer, 1990). This method produces a carbon soot containing approximately 10–20% fullerene materials, the majority of which is $C_{60}$ and $C_{70}$. Of this 10–20%, only ca. 1% of the fullerenes are of the metallo-endohedral variety. Because the empty and endohedral fullerenes are formed together as an intimate mixture, it is necessary to first separate them from each other before investigations of their individual properties can proceed.

Chemical aspects of endohedral metallofullerenes and their purification have been the subjects of several published review articles (Bethune, 1993; Nagase, 1996; Liu, 2000, Shinohara (2000)). Many scientific papers and reports concern the purification and separation of endohedral metallofullerenes from empty fullerenes.

The great majority of these papers and reports involve chromatographic techniques, particularly high performance liquid chromatography (HPLC). Three of the key papers describing the first HPLC purifications of endohedral metallofullerenes are Shinohara et al. (Shinohara, 1993) for $Sc_2@C_{74}$, $Sc_2@C_{82}$, and $Sc_2@C_{84}$, Kikuchi et al. (Kikuchi, 1993) for $La@C_{82}$, and Yamamoto et al. (Yamamoto, 1994) for $La@C_{82}$. The most productive HPLC protocols now use dual-stage chromatographic procedures; a recent report detailing this is Okazaki et al. (Okazaki, 2000) highlighting the HPLC separation of $Sm@C_{2n}$ species. This dual-stage HPLC procedure uses two commercially available HPLC columns in series, the "Buckyprep" (Nakalai Tesque, Japan) and the "Buckyclutcher" (Regis Chemical, USA) columns, both of which are special columns developed for the separation of fullerene compounds. Meyerhoff (Xiao, 1994) reported that a derivatized triphenylporphyrin-silica HPLC stationary phase was efficient for the one-stage separation of $La@C_{82}$ and $Y@C_{82}$ from empty fullerenes.

Various solvent extraction procedures have been devised by which the content of endohedral fullerenes are enriched relative to the empty fullerenes. Typically these procedures use polar solvents to extract higher ratios of endohedral fullerenes relative to the empty fullerenes in as-produced fullerene soot. Examples of solvents used and endohedral fullerenes extracted include:

N-N-dimethylformamide for $M@C_{82}$ (M=Ce, Ding, 1996; M=Gd, Sun, 1999)

Aniline for $M@C_{60}$ (M=Y, Ba, La, Ce, Pr, Nd, Gd, Kubozono, 1996)

Pyridine for mixed $M@C_{2n}$ (M=La, Ce, Liu, 1998).

Similar solvent extractions have been conducted prior to HPLC separations of endohedral metallofullerenes to increase the efficiency of the chromatographic operation. Tso et al. (Tso, 1996) reported a non-chromatographic procedure for enrichment of mixed $Sc_m@C_{2n}$. A solid phase extraction with $C_{18}$-bonded silica was performed on a chlorobenzene solution of empty fullerenes and $Sc_m@C_{2n}$; 20 to 30% of the empty fullerenes were selectively removed by this technique.

Sublimation techniques that partially enrich the endohedral fullerene content of mixed fullerene materials have been reported. Yeretzian et al. (Yeretzian, 1993) reported a gradient sublimation method for partial enrichment of $La@C_{82}$. Diener et al. (Diener, 1997) conducted a variable temperature sublimation study of $La@C_{2n}$ and $U@C_2n$. Cagle et al. (Cagle, 1999) reported a dual-temperature sublimation enrichment of $HO_m@C_{82}$. Ogawa et al. (Ogawa, 2000) recently reported a vacuum-sublimation enrichment of $Er@C_{60}$.

The preparation of discrete ionic fullerene compounds in condensed media has been extensively reviewed (Reed, 2000(a)). This review covers the relevant literature from the discovery of the macroscopic production of fullerenes (ca. 1990) to the present. Synthesis and full experimental details for the isolation of salts of the fullerene cations $C_{76}^+$ (Bolskar, 1996; Bolskar, 1997), $C_{70}^+$ (Bolskar, 1997), $C_{60}^+$ (Bolskar, 1997; Reed, 2000(b)) and $HC_{60}^+$ (Reed 2000(b)) were reported as indicated. Tumanskii et al. (Tumanskii, 1998) reported the in-situ detection of proposed $H(La@C_{82}^+)$ and $H(Y@C_{82}^+)$ species.

U.S. Pat. No. 6,303,016 to Diener et al. discloses a method for extracting small bandgap fullerenes from a mixture based on reducing the small bandgap fullerenes until they can be solvated. Once dissolved, the small band gap fullerenes can be recovered by returning them to their charge neutral state. In a similar method, the electrochemical separation of the "small-bandgap" fullerene $C_{74}$ from other empty "large-bandgap" fullerenes by a reductive electrochemical procedure was performed (Diener, 1998). In that procedure, the anion $C_{74}^-$ was selectively produced as it reduces at a more positive potential than most of the empty fullerenes, due to its unusually high electron affinity. The $C_{74}^-$ anion was then separated from the neutral fullerenes and finally plated out as a neutral species on a platinum electrode by bulk electrochemical single-electron oxidation. This procedure was also demonstrated in conjunction with endohedral Gd-metallofullerenes, producing a material enriched in $Gd@C_{2n}$ and $C_{74}$ but deficient in large-bandgap empty fullerenes. The basis for this procedure is the notably higher first reduction potential of $C_{74}$ (and $Gd@C_{2n}$) as compared to the empty fullerenes. In principle, a similar reductive protocol could be conducted to separate endohedral metallofullerenes from empty larger-bandgap fullerenes or to separate fullerenes larger than $C_{70}$ from the highly abundant $C_{60}$ and $C_{70}$.

Some time after the isolation of discrete fulleride (reduced fullerene) species, reversible electrochemical detection of empty fullerene cations (or fullereniums), i.e., fullerenes with one electron removed from the HOMO level of the neutral molecule, was achieved. This required more rigorous conditions and different solvents than those needed for the electroreduction experiments. Because the HOMO levels of common, empty fullerenes are relatively low-lying in energy, the fullerene cation species formed by removal of an electron from this HOMO are highly electrophilic. This property makes the fullereniums highly reactive toward nucleophiles. For these reasons, fullerene cations are very reactive toward even trace quantities of solvent impurities like water, so very high solvent purity and strictly water free conditions are preferred for their production. Preferred solvents are non-nucleophilic and weakly coordinating. Chlorinated alkane and arene solvents were found to be suitably non-reactive towards the transient cations produced in the electrochemical experiments. One-electron oxidation potentials for the empty fullerenes are summarized in the $E_1^{Ox}$ column of Table 1. Note that the most abundant fullerenes $C_{60}$ and $C_{70}$ are more difficult to oxidize than the scarcer higher fullerenes. The high oxidation potentials for oxidation (greater than ca. +0.7 V vs. Fc/Fc$^+$) confirm that these fullerene cations are highly reactive species.

Since the timescale of electrochemical generation and detection of fullerenium ions is on the order of seconds, these results did not guarantee that fullerene cations could be prepared and isolated as discrete salts. Fullerenium cation synthesis is a greater synthetic challenge than the isolation of discrete fulleride anions. Bolskar et al. (Bolskar, 1996) state "the problem of oxidizing fullerenes to fullerene cations is the problem of finding an oxidant strong enough for the task, but one which does not bring along with it a reactive nucleophile." The oxidant must have enough thermodynamic driving force to abstract an electron from the neutral fullerene. Once accomplished, the now reduced oxidant must not subsequently react with the newly formed fullerene cation. The oxidant reagent also needs to deliver a counter-anion to balance the newly formed positive charge of the fullerene cation. This anion also must be inert and not react with the fullerene cation in any manner neither by nucleophilic attack and addition nor by electro-reducing the fullerene. The first synthesis of a fullerenium cation salt, that of $[C_{76}^+][CB_{11}H_6Br_6^-]$ (Bolskar, 1996), is illustrative of these principles. $C_{76}$ was chosen as the first test case for fullerene oxidation because its oxidation potential is lower than that of $C_{60}$ (and $C_{70}$) and it is commercially available as the pure $D_2$ isomer. The synthesis of $[C_{76}^+][CB_{11}H_6Br_6^-]$ proceeded in the following manner (Equation 1):

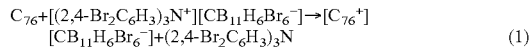

$$C_{76}+[(2,4\text{-}Br_2C_6H_3)_3N^+][CB_{11}H_6Br_6^-] \rightarrow [C_{76}^+][CB_{11}H_6Br_6^-]+(2,4\text{-}Br_2C_6H_3)_3N \quad (1)$$

The oxidizing agent in this case was the radical cation of tris(2,4-dibromophenyl)amine. With an E° of +1.16 V, it has sufficient oxidizing power to remove an electron from $C_{76}$ ($E_1^{Ox}$=+0.81 V). The neutral amine reduction by-product is very weakly basic for steric and electronic reasons and does not react with the newly formed fullerene cation. The hexabrominated "carborane" $[CB_{11}H_6Br_6^-]$ anion of the oxidizing reagent, which becomes the counterion to $C_{76}^+$, is perhaps one of the least nucleophilic and least reactive anions known (Reed, 1998) and does not react with the fullerenium ion. The hexahalogenated carborane anions ($[CB_{11}H_6X_6^-]$, X=F, Cl, Br, I) have been shown to be exceptionally weakly nucleophilic and weakly coordinating such that a variety of extremely electrophilic cations once thought impossible to isolate can now be synthesized. An excellent example of this is the recent synthesis (Reed, 2000(b)) of the fullerenium radical cations $C_{60}^+$ and $C_{70}^+$ via a very strong oxidant paired with the hexachlorinated carborane counter-anion, $[CB_{11}H_6Cl_6^-]$. The new solid superacid $[H^+][CB_{11}H_6Cl_6^-]$ incorporating this exceptionally inert anion was also synthesized and used to protonate $C_{60}$ (Reed, 2000(b)). The stable and fully characterized compound $[HC_{60}^+][CB_{11}H_6Cl_6^-]$ is the first example of an isolated protonated fullerene species. These accomplishments of extreme oxidation and protonation, i.e., the synthesis of $C_{60}^+$ and $HC_{60}^+$ in condensed media, serve to demonstrate that fullerenes can in fact be protonated and oxidized and that the resulting cationic fullerene species are stable and can be handled and isolated under appropriate experimental conditions.

There remains a need in the art for improved methods for purifying fullerenes, especially endohedral fullerenes. The present invention provides a new, alternative purification strategy that exploits strong chemical property differences between the empty and endohedral.

SUMMARY OF THE INVENTION

Fullerenes are typically obtained from soot obtained by combustion or electric-arc methods. $C_{60}$ is the most abundant fullerene in the soot. Such soots also can contain minor amounts of other fullerenes, such as, higher fullerenes, metallofullerenes, endohedral fullerenes and so on. Purifying minor components from complex mixtures is the stereotypical recalcitrant problem faced by many scientists. In this invention, the problem of purifying minor components was solved by chemically modifying the desired fullerenes. The chemical modification of the desired fullerenes provides a chemical property difference between the desired and undesired fullerenes which allows for separating the fullerenes. For example, the invention allows purification and separation of endohedral fullerenes from empty fullerenes and thereby resolves a long-standing problem in fullerene science.

The invention provides a method of separating a first and a second set of fullerenes in a fullerene mixture comprising the steps of providing a fullerene mixture comprising a first set and a second set of fullerenes; forming a stable fullerene cation of one of the first or the second set of fullerenes, wherein the fullerene cation is formed in a solvent; and separating the fullerene cation from the other set of fullerenes. The selective formation of cation species is performed by chemical oxidation, electrochemical oxidation, or chemical addition of cationic electrophilic groups and is followed by a recrystallization or precipitation procedure by which the cationic species are separated from the neutral species.

The method of the invention is applicable and adaptable to the separation and purification of different classes of fullerenes, including but not limited to metal and non-metal containing endohedral fullerenes, higher empty fullerenes, exohedrally derivatized empty and endohedral fullerenes, empty and endohedral heterofullerenes, and combinations thereof.

In an embodiment, the invention relates to a method of purifying fullerenes based on differences between the oxidation potentials of specific classes of fullerenes or specific fullerenes. In particular, arc synthesis of endohedral fullerenes produces a mixture of fullerene material. The fullerene material is a complex mixture of a variety of specific fullerenes, of which $C_{60}$ and $C_{70}$ are the most abundant. The $C_{60}$ and $C_{70}$ fullerenes have an oxidation potential that differs from many of the minor constituents of the fullerene material such as endohedral fullerenes and higher fullerenes. Oxidation of fullerene material in a solvent with an appropriate oxidizing agent selectively oxidizes endohedral fullerenes, higher fullerenes, and mixtures thereof, while leaving $C_{60}$ and $C_{70}$ neutral. The oxidized fullerenes are then precipitated or recrystallized by decreasing the polarity of the solvent, while the $C_{60}$ and $C_{70}$ fullerenes remain soluble. The solvent is separated from the precipitated oxidized fullerene and the oxidized fullerene can then be reduced back to the unoxidized fullerene with an appropriate reducing agent.

In an embodiment, the invention relates to a method of purifying selected fullerenes from a fullerene material. The method comprises the steps of: (a) providing a fullerene material, the fullerene material comprising the selected fullerenes and undesired fullerenes; (b) forming a stable fullerene cation of one of the selected fullerenes or the undesired fullerenes in a solvent; (c) decreasing the polarity of the solvent to precipitate the fullerene cation; and (d) separating the solvent from the precipitated fullerenes.

In one embodiment, the selected fullerenes have an oxidation potential that differs from undesired fullerenes of the fullerene material. In a preferred aspect of this embodiment, the selected fullerenes have an oxidation potential that differs from the oxidation potential of the undesired fullerenes of the fullerene material by 0.10 V (using the ferrocene standard). In another preferred aspect of this embodiment, the selected fullerenes have an oxidation potential that differs from undesired components of the fullerene material by 0.30 V using the ferrocene standard. In a preferred aspect of this embodiment, the selected fullerenes are endofullerenes, higher fullerenes, metallofullerenes or mixtures thereof.

In another embodiment, the invention relates to a method of enhancing the purity of selected fullerenes. The method comprises the steps of (a) providing a fullerene material, the fullerene material comprising the selected fullerenes and undesired fullerenes; (b) forming a stable fullerene cation of one of the selected fullerenes or the undesired fullerenes in a solvent; (c) decreasing the polarity of the solvent to precipitate the fullerene cation; and (d) separating the solvent from the precipitated fullerenes, thereby enhancing the purity of the selected fullerenes.

The selective formation of cation species is performed by chemical oxidation, electrochemical oxidation, or chemical addition of cationic electrophilic groups and is followed by a recrystallization or precipitation procedure by which the cationic species are separated from the neutral species.

In yet another embodiment, the invention relates to a method of preparing an endohedral fullerene substantially free of $C_{60}$ and $C_{70}$ fullerenes comprising the steps of providing a fullerene material, the fullerene material containing $C_{60}$ and $C_{70}$ fullerenes and an endohedral fullerene; forming a stable fullerene cation of the endohedral fullerene, wherein the fullerene cation is formed in a solvent; decreasing the polarity of the solvent to precipitate the fullerene cation; and separating the solvent containing the $C_{60}$ and $C_{70}$ fullerenes from the precipitated endohedral fullerene.

In yet another embodiment, the invention relates to a method of separating $C_{60}$ and $C_{70}$ fullerenes from fullerene material comprising the steps of providing a fullerene material, the fullerene material containing a first set of $C_{60}$ and $C_{70}$ fullerenes and a second set of other fullerenes; forming a stable fullerene cation of the second set of fullerenes, wherein the stable fullerene cation is formed in a solvent; decreasing the polarity of the solvent to precipitate the fullerene cation; and separating the solvent containing the $C_{60}$ and $C_{70}$ fullerenes from precipitated second set of fullerenes The method of chemically separating minority fullerene materials from mixtures with other majority fullerene materials by exploiting particular chemical and redox properties can be used for the purification of a broad range of endohedral and empty fullerene materials. A general procedure is described herein for the separation of metal-containing endohedral fullerenes from the empty fullerenes which is applicable to fullerene materials possessing appropriate chemical and/or redox characteristics including, but not limited to, the following examples:

(A) Separation of $M@C_{82}$ endohedral metallofullerenes from empty fullerenes and other $M_m@C_{2n}$ endohedral fullerenes by selective chemical or electrochemical one-electron oxidation of $M@C_{82}$ species to their molecular cations, $M@C_{82}^+$. This includes all different possible structural isomers and/or enantiomers of $M@C_{82}$. (M is an element from the periodic table; the "@" symbol refers to the endohedral or interior nature of the M atom inside of the fullerene cage; m is the integer 1, 2, or 3; n is an integer number)

(B) Separation of $M_m@C_{2n}$ endohedral metallofullerenes as individual molecular species and/or as a general class from empty fullerenes by selective chemical or electrochemical one-electron oxidation of $M_m@C_{2n}$ species to their molecular cations $M_m@C_{2n}^+$. This includes the extraction and separation of $M_m@C_{2n}$ endohedrals which are highly insoluble in their neutral states but are soluble and extractable as molecular cations; many of these species have never before been isolated. This also includes all different structural isomers and/or enantiomers of $M_m@C_{2n}$.

(C) Separation of specifically those insoluble $M@C_{2n}$ species abundant in sublimates such as $M@C_{60}$, $M@C_{70}$, and $M@C_{74}$ with M=trivalent endohedral lanthanides (Ce, Pr, Nd, Gd, Tb, Dy, Ho, Lu and possibly Er) by selective chemical or electrochemical one-electron oxidation of $M@C_{2n}$ species to their molecular cations $M@C_{2n}^+$. In particular, the separation can be accomplished by solvent washing removal of soluble $C_{2n}$ and $M@C_{2n}$ and oxidative solubilization and removal of oxidizable $C_{2n}$ and $M@C_{2n}$ species, leaving behind the insoluble $M@C_{2n}$ materials.

(D) Separation of specifically those insoluble $M@C_{2n}$ species abundant in sublimates such as $M@C_{60}$, $M@C_{70}$, and $M@C_{74}$ with M=divalent endohedral lanthanides (Sm, Eu, Tm, Yb) by selective chemical or electrochemical one-electron oxidation of $M@C_{2n}$ species to their molecular cations $M@C_{2n}^+$.

(E) Separation of empty higher fullerenes $C_{2n}$ (those larger than $C_{60}$ and $C_{70}$) as a general class from $C_{60}$ and $C_{70}$ by selective chemical or electrochemical one-electron oxidation of $C_{2n}$ species to their molecular cations, $C_{2n}^+$ (in the absence of endohedral fullerenes). This includes all different possible structural isomers and/or enantiomers of $C_{2n}$.

(F) Separation of empty fullerenes and endohedral fullerenes exohedrally derivatized by functional groups that are selectively oxidizable by chemical or electrochemical means to form cationic derivatized fullerene and endohedral fullerene species. The resulting oxidized component is the fullerene cage structure, the exohedral functionalization, or both components together.

(G) Separation of skeletally substituted empty and endohedral fullerenes (e.g. heterofullerenes) from non-substituted fullerenes and endohedral fullerenes by selective chemical or electrochemical oxidation of those heterofullerenes which have one or more individual carbon atom(s) of their fullerene shells replaced by elements other than carbon, to their molecular cations.

(H) Separation of non-metal containing endohedral fullerenes (e.g. $N_m@C_{2n}$, $P_m@C_{2n}$, etc.) from empty fullerenes by selective chemical or electrochemical one-electron oxidation of the given endohedral species to its corresponding molecular cation. This invention is also applicable to the separation of mixed multi-element containing endohedral fullerenes, e.g., $Sc_3N@C_{80}$, $ErSc_2N@C_{80}$, etc.

(I) Achievement of all the above categories of separation (A through H) based on selective formation of cationic fullerene species by chemical protonation or addition of other cationic electrophilic groups, which is distinct from fullerene cation formation via the aforementioned chemical or electrochemical oxidation. Cation formation can equally be conducted by oxidative electrochemistry or by chemical addition of a cationic agent, such as protonation by a Brønsted acid or addition of an electrophile. Photochemical cation generation methods can be used in the invention and are considered a subset of general chemical methods to oxidation and protonation.

The instant invention describes general methods for the production of new cationic fullerene species. These fullerene cations can subsequently be put to other uses, for example, they can be used in ensuing derivitization reactions with nucleophiles to produce exohedrally derivatized fullerene and/or endohedral fullerene compounds that may not be obtained through other routes.

The chemical purification methods described herein are also be applicable to fullerene materials produced by new production methods other than the standard arc-discharge and laser ablation methods of producing fullerenes. For example, the described chemical purification procedures can be applied to any new production method that produces materials containing higher yields of endohedral fullerenes than currently available. The general methods described herein will allow the large-scale isolation of pure endohedral metallofullerene compounds in a manner not possible prior to this disclosure.

The invention presents a significant improvement over prior separation and purification technologies, the chief of which is high-performance liquid chromatography (HPLC). The invention exploits strong chemical property differences between the fullerene materials to be separated. As HPLC separations of fullerene materials typically depend on chemical properties that are similar amongst fullerenes, they therefore require substantial time and economic input. The invention also uses commonly available equipment, unlike HPLC, and commonly available solvents and reagents. The disclosed invention is also more amenable to a bulk scale-up compared to chromatographic techniques. The disclosed procedures can also be used as preparatory steps prior to chromatographic techniques, greatly increasing their efficiency. Advantageously the method of the invention produces the final purified product(s) in the solid state, thus avoiding difficult removal of low vapor pressure and high-boiling solvents.

The disclosed oxidative extraction procedure is a significant improvement over the prior technology in that it allows efficient extraction of $M_m@C_{2n}$ which are normally insoluble and unextractable as neutral species (or soluble or extractable at best with a very low efficiency) as cations. This increases the total available yield of endohedral fullerenes. This is an improvement over the various solvent extraction procedures that use highly polar and/or coordinating solvents as agents of partial preferential extraction. Such solvents extract endohedral fullerenes at lower efficiencies than the disclosed invention and as mixtures with empty fullerenes. Also, this invention avoids the use of these highly polar and/or coordinating solvents, which may irreversibly bind in an unknown manner exohedrally to endohedral metallofullerenes.

DETAILED DESCRIPTION OF THE INVENTION

Figure 1:
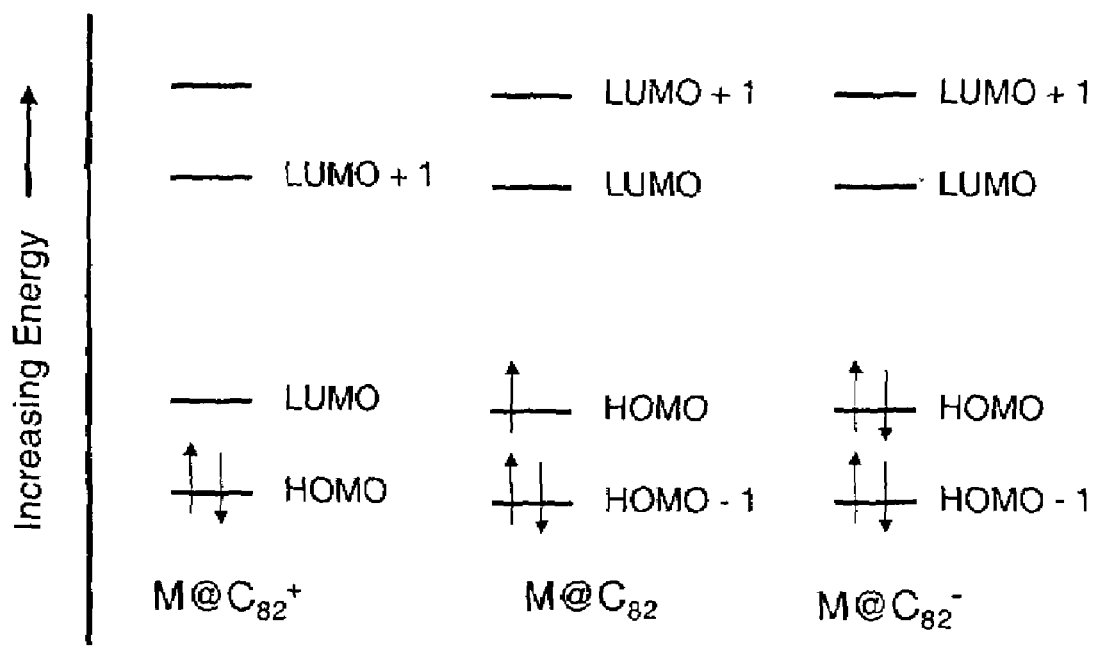
FIG. 1 shows a comparison of the frontier orbital levels of $M@C_{82}^+$, $M@C_{82}$, and $M@C_{82}^-$ (where M is in its 3+state, donating 3 electrons as in the formalism $M^{3+}@C_{82}^{3-}$).

Unless otherwise stated, the following terms are accorded the following definitions.

As used herein the term "fullerene material" generally refers to a material containing one or more specific fullerenes. Typically the term "fullerene material" refers to a raw or crude preparation of fullerenes, i.e., soot, although this term can also be used in reference to raw or crude preparations of fullerenes that have been further processed yet contain a mixture of specific fullerenes.

As used herein the term "fullerene" can refer to a specific fullerene or class of fullerenes that can be distinguished from other fullerenes based on a physical or chemical property, i.e., oxidation potential or reduction potential. If the fullerene is a class of fullerenes rather than a specific fullerene, the physical or chemical properties may have a range of values, i.e., the oxidation potential of the set may cover a range of values. In a separation process, one fullerene in a fullerene material may be termed a "selected" or "desired" fullerene while the other fullerene(s) may be termed "rejected" or "undesired" fullerene(s). Fullerenes suitable for use with the present invention include, but are not limited to, empty fullerenes, derivatized empty fullerenes, empty higher fullerenes, empty small-bandgap fullerenes, heterofullerenes, endohedral fullerenes, and derivatized endohedral fullerenes, and giant fullerenes where N is 50 or more which may be nested and/or multi-concentric fullerenes As used herein, the term "cation" may refer to one or more cations. As used herein the term "stable cation" refers to a cation which does not revert to a neutral state or irreversibly react under the conditions of its formation.

As used herein the term "oxidized fullerene" refers to fullerenes to which an electron was removed from or to fullerenes to which a positive charge was added. As used herein an "easily oxidizable fullerene" is a fullerene with an oxidation potential of less than or equal to about 0.8V (vs. the ferrocene/ferrocenium couple).

As used herein the term "endohedral fullerene substantially free of $C_{60}$ and $C_{70}$ fullerenes" refers to a preparation of endohedral fullerene which is less than 20 percent by weight of $C_{60}$ and $C_{70}$ fullerenes. Preferably, "endohedral fullerene substantially free of $C_{60}$ and $C_{70}$ fullerenes" refers to a preparation of endohedral fullerene which is less than 20 percent by weight of $C_{60}$ and $C_{70}$ fullerenes.

In general, fullerenes have "low solubility" in all solvents compared to most organic compounds. For this application, we define relative solubility with the terms soluble, moderately soluble, slightly soluble, substantially insoluble and insoluble on a scale based on the known solubility of fullerene $C_{60}$ in various solvents (See: Ruoff et al., 1993). $C_{60}$ is insoluble in polar solvents like acetonitrile and methanol (no measurable amount dissolves). $C_{60}$ is substantially insoluble in the polar solvent tetrahydrofuran (~0.001 mg/mL or less). $C_{60}$ is slightly soluble in alkane hydrocarbons (0.002 to 2 mg/mL) and haloalkanes (0.1 to 5 mg/mL). $C_{60}$ is slightly soluble to soluble in various arenes (ranging from 1.7 mg/mL in benzene to 27 mg/mL in 1,2-dichlorobenzene). $C_{60}$ is soluble in substituted naphthalenes (30 to 50 mg/mL). The definitions used herein are thus, insoluble approximately 0 mg/mL; substantially insoluble greater than 0 mg/ml and less than or equal to about 0.001 mg/mL (this represents trace amounts); slightly soluble between about 0.002 to about 5 mg/mL; moderately soluble greater than 5 mg/mL and less than about 20 mg/mL; and soluble greater than about 20 mg/mL. As noted above, insoluble classes of fullerenic species are also insoluble in non-reactive polar solvents. Those classes of fullerenes that are soluble in common solvents (e.g., $C_{60}$) are either insoluble, substantially insoluble or slightly soluble in polar solvents depending on the fullerene in question.

Fullerenes and endohedral fullerenes (those fullerenes encapsulating an atom or atoms in their interior space) are a recently discovered class of chemical compounds. Fullerenes are all-carbon molecular cages with no dangling or terminal bonds. $C_{60}$ is the most abundant fullerene, with $C_{70}$ the next most common. Larger $C_{2n}$ species, i.e., $C_{76}$, $C_{78}$, $C_{82}$, $C_{84}$, etc., (2n between 70 and 100) are called the "higher fullerenes." A distinct class of empty fullerene molecules are those with small HOMO-LUMO gaps such as $C_{74}$ ($D_{3h}$) and $C_{80}(I_h)$, which behave as small-bandgap materials in the solid state (Diener, 1998). These empty fullerenes may be termed "small band-gap fullerenes".

The term "fullerene" is used generally herein to refer to any closed cage carbon compound containing both six-and five-member carbon rings independent of size and is intended to include the abundant lower molecular weight $C_{60}$ and $C_{70}$ fullerenes, larger known fullerenes including $C_{76}$, $C_{78}$, $C_{84}$ and higher molecular weight fullerenes $C_{2N}$ where N is 50 or more (giant fullerenes) which may be nested and/or multi-concentric fullerenes. The term is intended to include "solvent extractable fullerenes" as that term is understood in the art (generally including the lower molecular weight fullerenes that are soluble in toluene or xylene) and to include higher molecular weight fullerenes that cannot be extracted, including giant fullerenes which can be at least as large as $C_{400}$. Additional classes of fullerenes include, among others specifically noted herein, endohedral fullerenes contains one or more elements, particularly one or more metal elements, and heterofullerenes in which one or more carbons of the fullerene cage are substituted with a non-carbon element, such as B or N. The term fullerenic material is used generally to refer to a material that contains a mixture of fullerenes or a mixture of one or more fullerenes with non-fullerenes, e.g., amorphous carbonaceous materials that may for example be formed during fullerene synthesis by any known method and includes raw or crude preparations of fullerenes, such as combustion soot as well as raw or crude preparations of fullerenes that have been at least partially purified, for example, by extraction and/or sublimation.

Fullerenes are members of a broader class of materials called "carbon nanomaterials" which as used herein generally refers to any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, fullerenes, single-walled carbon nanotubes (SWNTs), multiple-walled carbon nanotubes (MWNTs), nanotubules, and nested carbon structures with dimensions on the order of nanometers. Carbon nanomaterials may be produced in soot and, in certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The term "carbon nanomaterials," when used without limitation, is intended to include soot containing detectable amounts of carbon nanomaterials. For example, the term fullerenic soot is used in the art to refer to soot containing fullerenes. Fullerenic soot is encompassed by the term carbon nanomaterials. Non-fullerenic carbonaceous materials include, but are not limited to, non-fullerenic carbon nanomaterials as well as amorphous carbonaceous materials. Carbon nanomaterials are not amorphous carbonaceous materials.

Endohedral fullerenes are fullerene cages that encapsulate an atom or atoms in their interior space. They are written with the general formula $M_m@C_{2n}$, where M is an element, m is the integer 1, 2, 3 or higher, and n is an integer number. The "@" symbol refers to the endohedral or interior nature of the M atom inside of the fullerene cage. Endohedral fullerenes corresponding to most of the empty fullerene cages have been produced and detected under varied conditions. Endohedral metallofullerenes useful for the present invention, include, but are not limited to those where the element M is a lanthanide metal, a transition metal, an alkali metal, an alkaline earth metal, and a radioactive metal. Other endohedral fullerenes useful for the present invention are those containing radioactive elements. Radioactive elements include naturally occurring and non-naturally occurring isotopes. Radioactive elements also include nonmetals and semimetals such as iodine, phosphorus, bismuth, antimony, arsenic and tin as well as metals such as the actinide metals. Endohedrals containing lanthanide metals have by far received the most attention to date, although studies on non-metallo endohedrals such as $He@C_{60}$, $N@C_{60}$, $P@C_{60}$, etc. are developing. Of the $M_m@C_{2n}$ metallo-endohedrals, the ones having the particular formulation $M@C_{82}$ are the subject of most investigations to date. The study of other M@$C_{2n}$ and multiple-metal containing $M_m$@$C_{2n}$ materials is proceeding at a slower rate because of the very low availabilities of the isolated materials needed for characterization.

The invention provides a method of separating a first and a second fullerene in a fullerene material comprising the steps of:

(a) introducing the fullerene material into a solvent;
(b) forming a stable fullerene cation from the first fullerene, wherein the solvent is selected so that at least one of the fullerene cation or the second fullerene is soluble therein; and
(c) separating the fullerene cation or a salt thereof from the second fullerene.

Optionally, the method may include the step of returning the cation to a neutral state.

The selective formation of cationic fullerene species is performed by chemical oxidation, electrochemical oxidation, or chemical addition of cationic electrophilic groups. Cation formation can equally be conducted by oxidative chemistry or by chemical addition of a cationic agent, such as protonation by a Brønsted acid or addition of an electrophile. Photochemical cation generation methods can be used in the invention and are considered a subset of general chemical methods to oxidation and protonation.

The selective formation of cationic fullerene species is followed by a separation procedure. The separation procedure may be accomplished in several ways. In one embodiment, the second fullerene and the fullerene cation are both substantially soluble in the solvent and fullerene cation is separated from the second fullerene by decreasing the polarity of the solvent to precipitate a salt of the fullerene cation and separating the fullerene cation salt precipitate from the solvent. The first fullerene may be soluble in the solvent or not. This procedure exploits the solubility differences of cationic fullerene compounds and neutral fullerene compounds. Ionic compounds are soluble in solvents with a higher polarity and higher dielectric constants, whereas the opposite is generally true for neutral compounds. This can be used to separative advantage. Some solvents like o-dichlorobenzene (ODCB) are capable of dissolving fullerene anions, cations, and neutral species. When a nonpolar solvent such as the hydrocarbon hexane is added to an ODCB solution of mixed fullerene neutral and cationic molecules, the polarity is drastically reduced, causing the cations to precipitate as a solid salt while the majority of the neutrals remain in solution.

In another embodiment, the separation procedure is as follows. The first and second fullerene are substantially soluble in the solvent, the fullerene cation is substantially insoluble in the solvent, and the fullerene cation is separated from the second fullerene by precipitating a salt of the fullerene cation and separating the fullerene cation salt precipitate from the solvent. Precipitation occurs upon the oxidative cation formation.

In another embodiment, the separation procedure is as follows. The first and second fullerene are substantially insoluble in the solvent, the fullerene cation is substantially soluble in the solvent, and the fullerene cation is separated from the second fullerene by separating the insoluble second fullerene from the solvent.

Oxidation of Fullerenes

Empty fullerenes generally are easy to reduce (reduction=addition of electron(s)) while conversely being difficult to oxidize (oxidation=removal of electron(s)). The molecule $C_{60}$ is the prototypical example of this. With its low-lying, triply degenerate HOMO level, $C_{60}$ can accept up to six electrons. In solution six electrochemically reversible reductions were detected and their potentials measured by cyclic voltammetry and various pulsed techniques. Further electrochemical studies revealed that $C_{70}$ and the higher fullerenes display similar behavior. Data for up to the fourth reduction level of selected empty fullerenes is summarized in Table 1 below.

TABLE 1

Selected Redox Parameters of Empty Fullerenes in Solution vs the Ferrocene Standard (ferrocene/ferrocene$^+$ = 0.0 V, cyclic voltammetry unless otherwise noted).

| Fullerene | Solvent$^a$ | $E_1^{Red}$ | $E_2^{Red}$ | $E_3^{Red}$ | $E_4^{Red}$ | $E_1^{Ox}$ | Reference |
|---|---|---|---|---|---|---|---|
| $C_{60}$ | PhMe/MeCN$^b$ | −0.98 | −1.37 | −1.87 | −2.35 | | Xie 1992 |
| | TCE$^d$ | −1.06 | | | | +1.26 | Xie 1993 |
| $C_{70}$ | PhMe/MeCN$^b$ | −0.97 | −1.34 | −1.78 | −2.21 | | Xie 1992 |
| | TCE$^d$ | −1.02 | | | | +1.20 | Xie 1993 |
| $C_{76}$ | PhMe/MeCN$^e$ | −0.83 | −1.17 | −1.68 | −2.10 | | Selegue 1994 |
| | TCE$^{d,f}$ | −0.83 | −1.12 | | | +0.81 | Yang 1995 |
| $C_{2v}$-$C_{78}$ | PhMe/MeCN$^e$ | −0.72 | −1.08 | −1.79 | −2.16 | | Selegue 1994 |
| | TCE$^{d,f}$ | −0.77 | −1.08 | | | +0.95 | Yang 1995 |
| $D_3$-$C_{78}$ | $CH_2Cl_2$ | −0.64 | −0.94 | −1.70 | −2.05 | | Boudon 1998 |
| | TCE$^{d,f}$ | −0.77 | −1.08 | | | +0.70 | Yang 1995 |
| $C_2$-$C_{82}$ | ODCB$^h$ | −0.69 | −1.04 | −1.58 | −1.94 | +0.72 | Suzuki 1996 |
| $C_{84}^i$ | TCE$^{d,f}$ | −0.67 | −0.96 | −1.27 | | +0.93 | Yang 1995 |
| $C_{86}^j$ | ODCB$^h$ | −0.58 | −0.85 | −1.60 | −1.96 | +0.73 | Suzuki 1996 |

$^a$Supporting electrolyte 0.1 M $Bu_4NPF_6$. $^b$At −10° C. $^c$5.4:1 PhMe:MeCN. $^d$TCE = 1,1',2,2'-tetrachloroethane. $^e$8:2 PhMe:MeCN. $^f$Osteryoung square wave voltammetry (OSWV). $^g$At −15° C. $^h$ODCB = o-dichloro-benzene. $^i$Isomer(s) not resolved. $^j$Major isomer.

Fullerenium cation synthesis is a greater synthetic challenge than the isolation of discrete fulleride anions. The oxidant must have enough thermodynamic driving force to abstract an electron from the neutral fullerene. Once accomplished, the now reduced oxidant must not subsequently react with the newly formed fullerene cation. The oxidant reagent also needs to deliver a counter-anion to balance the newly formed positive charge of the fullerene cation. This anion also must be inert and not react with the fullerene cation in any manner neither by nucleophilic attack and addition nor by electro-reducing the fullerene. Typically, fullerene cations are very reactive toward even trace quantities of solvent impurities like water, so very high solvent purity and strictly water free conditions are preferred for their production.

In general, of all the empty common fullerenes, $C_{60}$ is the hardest to oxidize (having the highest ionization potential) and likely the most difficult to protonate. The cation $C_{60}^+$ has been synthesized via a very strong oxidant paired with the hexachlorinated carborane counter-anion, $[CB_{11}H_6Cl_6^-]$ (Reed, 2000(b)). For the oxidation of fullerene molecules less demanding than $C_{60}$, there is a variety of weaker chemical oxidizing agents that are commonly used in synthetic chemistry (Connelly, 1996). Similarly, there exist a variety of anions less exotic than the halogenated carboranes $[CB_{11}H_6X_6^-]$ that are not as weakly nucleophilic and weakly coordinating but are sufficient as counteranions for less electrophilic species (Strauss, 1993). Protonation of fullerenes larger than $C_{60}$ may be less demanding than that of $C_{60}$, in analogy to chemical oxidation of $C_{60}$ and the higher fullerenes, but will still require appropriate synthetic conditions including but not limited to anaerobic conditions, purified and water free solvents, non-nucleophilic solvents, non-nucleophilic anions, and acidity sufficient for protonation of the given fullerene.

The chemistry of endohedral fullerene compounds is less well developed than the corresponding chemistry of the empty fullerenes, primarily because of the relative scarcity of endohedral fullerenes—they constitute only several percent of the total fullerene content produced by the arc discharge method and are very difficult to separate from the much more abundant empty fullerenes.

Relevant to this invention are the recently reported accounts of the transient electrochemical detection of metallofullerene cations and anions in fluid solution. The data obtained in these experiments provide a relative measure of the energies needed to add and remove electrons to and from the endohedral metallofullerenes. Electrochemical data on $M@C_{82}$ endohedral metallofullerenes (and one $M_2@C_{80}$ species) obtained with various techniques are summarized in Table 2.

The data in Table 2 indicate that the redox properties of metallofullerenes have both similarities to and differences from those of the empty fullerenes. The endohedral metallofullerenes undergo multiple reductions, similar to the empty fullerenes. However, their first reductions are typically at higher potentials (more positive, i.e. easier to add an electron) than the larger empty fullerenes. The endohedral metallofullerenes also display single-electron oxidations at much lower potentials than do the empty fullerenes. In fact, these oxidations are at potentials >1 V lower (easier) than the oxidation potentials of the fullerenes $C_{60}$ and $C_{70}$. Also of note in Table 2 are the electrochemical measurements performed on the very recently isolated minor isomers of $La@C_{82}$ and $Pr@C_{82}$. These minor structural isomers are seen to display one-electron reduction and oxidation characteristics similar to those of their respective major isomers. Two reports describe some of the electrochemistry of multiple-metal containing endohedrals. $La_2@C_{80}$ reduces slightly easier than the mono-metallofullerenes and oxidizes at a slightly higher potential (Suzuki, 1995). Electrochemical measurements on $Sc_3@C_{82}$ in the strongly coordinating solvent pyridine were also reported (Anderson, 1997). Table 2 reveals that placing a metal atom (or atoms) inside of fullerene cages alters its redox characteristics.

TABLE 2

Selected Redox Parameters of Selected $M @ C_{82}$ Endohedral Fullerenes vs the Ferrocene Standard (Ferrocene/Ferrocene$^+$ = 0.0 V).[a]

| Compound | $E_1^{Red}$ | $E_2^{Red}$ | $E_3^{Red}$ | $E_4^{Red}$ | $E_1^{Ox}$ | Reference |
|---|---|---|---|---|---|---|
| $La @ C_{82}$[b] | −0.42 | −1.37 | −1.53 | −2.26 | +0.07 | Suzuki 1996 |
| $Gd @ C_{82}$[b] | −0.39 | −1.38[c] | | −2.22[c] | +0.09 | Suzuki 1996 |
| $Ce @ C_{82}$[b] | −0.41 | −1.41 | −1.53 | −1.79 | +0.08 | Suzuki 1996 |
| $Y @ C_{82}$[b] | −0.37 | −1.34[c] | | −2.22 | +0.10 | Suzuki 1996 |
| $Pr @ C_{82}$[b] | −0.39 | −1.35 | −1.46 | −2.21 | +0.07 | Akasaka 2000b |
| $La @ C_{82}$ - II[d] | −0.48 | −1.41[c] | | −2.01 | −0.07 | Akasaka 2000b |
| $Pr @ C_{82}$ - II[d] | −0.48 | −1.39[c] | | −1.99 | −0.07 | Akasaka 2000b |
| $La_2 @ C_{80}$ | −0.31 | −1.71 | −2.13[e] | | +0.56 | Suzuki 1995 |

[a]Solvent: o-dichlorobenzene (ODCB), supporting electrolyte 0.1 M Bu$_4$NPF$_6$, data obtained by cyclic voltammetry and differential pulse voltammetry [b]Major isomer ("I"). [c]Two-electron process. [d]Minor isomer ("II"). [e]Irreversible.

Following the electrochemical studies, Akasaka and co-workers reported the generation of reduced and oxidized solutions of both isomers ("A" and "B") of HPLC-purified $La@C_{82}$ with controlled potential electrolysis (Akasaka, 2000(a);. Akasaka, 2001). Vis-NIR spectroscopy revealed characteristic changes in the spectra of the ions versus neutral $La@C_{82}$. Interestingly, the anions $La@C_{82}^-$ were reported to be significantly stable in air, while the corresponding cations reportedly decomposed even under inert atmosphere.

The very large difference in oxidation properties between the major component of the fullerene arc product ($C_{60}$ and $C_{70}$) and the minor component (endohedrals, $M_m@C_{2n}$) provides the physical basis for the success of this invention in isolating endohedral from empty fullerenes. The reason for the relatively "easy" one-electron oxidation and reduction of the endohedral metallofullerenes can be partially explained by examining their electronic structures. FIG. 1 illustrates the basic molecular orbital (MO) diagram for typical $M@C_{82}$ species containing a three-electron donating (trivalent) metal like those in Table 2 (the trivalent metals in the case of $M@C_{82}$ are generally understood to include Sc, Y, La, Ce, Pr, Nd, Gd, Tb, Dy, Ho, Yb, Lu, U, Np and Am). Overall these molecules are neutral, but they can be formally written as zwitterions, i.e., $M^{3+}@C_{82}^{3-}$. The MO diagram reveals that these species are radicals, containing one unpaired electron in their singly degenerate HOMO levels. FIG. 1 also comparatively illustrates what happens when the electron in the HOMO is removed ($M@C_{82}^+$), or when another electron is added ($M@C_{82}^-$). In both cases, a closed shell molecule possessing a filled HOMO level is formed. Thus, single electron oxidation and reduction are both favorable and this helps explain why the $M@C_{82}$ species are so much easier to oxidize and reduce than normal, closed-shell fullerenes. Free radicals are generally more reactive than closed shell molecules, so the addition or removal of one electron from radical $M@C_{82}$ to form closed shell, metallofullerene +1 or −1 ions gives these species an added degree of stability. Importantly, because $M@C_{82}$ metallofullerenes oxidize so much more readily than $C_{60}$ and $C_{70}$, the cations $M@C_{82}^+$ can be preferentially formed under certain chemical conditions, even in the presence of great excesses of $C_{60}$ and $C_{70}$.

The electronic structures and MO diagrams of $M_m@C_{2n}$ species other than $M@C_{82}$ are less well known at this time. It is expected that most $M_m@C_{2n}$ have a similar radical electronic structure and relatively easy one-electron oxidation as seen with the $M@C_{82}$ species, particularly in the case of trivalent metals. With endohedral divalent metals, the oxidation potentials may be higher than those for the corresponding trivalent metallo-endohedrals, but still significantly lower than the oxidation potentials of $C_{60}$ and $C_{70}$. Thus, a purification strategy based on one-electron oxidations is also applicable to the different forms of $M_m@C_{2n}$, under the proper conditions. The less abundant structural isomers of $M_m@C_{2n}$ metallofullerenes are amenable to the purification methodology of the invention as well. Distinct from the endohedrals, there is a ca. 0.5 V difference in the oxidation potential of the empty higher fullerenes as a group ($E_1^{Ox}$ range from +0.7 to +0.9 V) from $C_{60}$ and $C_{70}$ ($E_1^{Ox}$=+1.3 and +1.2 V). Thus, oxidation can also serve as handle for the separation of empty higher fullerenes from the much more abundant $C_{60}$ and $C_{70}$.

There exist a wide variety of chemical oxidizing and reducing agents, weakly coordinating anions, and weakly nucleophilic solvents suitable for use in the oxidative based procedure of the present invention. Common chemical redox reagents have been extensively reviewed (Connelly, 1996). Specific redox potential and processability are important criteria when choosing these reagents. Ag$^+$ as an oxidant in the disclosed procedure is advantageous because its reduction by-product, Ag metal, is readily removed by filtration from the solution of the soluble, newly oxidized material. Other oxidizing agents effective in this, disclosed invention are the radical cations of substituted triarylaminium species, for example tris(4-bromophenyl)aminium (p-BrC$_6$H$_4$)$_3$N$^{+\cdot}$ and related derivatives of varying oxidative strength (Connelly, 1996; Bolskar, 1996). Further chemical oxidants include but are not limited to those discussed by Connelly and Geiger (Connelly, 1996).

A variety of weakly coordinating anions also exist as alternatives to hexafluoroantimonate (SbF$_6^-$) (Strauss, 1993). These include but are not limited to triflate, sulfate, perchlorate, hexachloroantimonate, hexafluorophosphate, hexachloroarsenate, hexafluoroarsenate, tetrafluoroborate, tetraarylborates and their various fluorinated substituted derivatives, tetrachloroaluminate, trifluoroacetate, carboranes of various compositions e.g. CB$_{11}$H$_6$X$_6^-$ (where X=H, F, Cl, Br, I, CH$_3$), CB$_{11}$(X)$_{12}^-$, (where X=F, Cl, CH$_3$), CB$_9$H$_{10}^-$, Co(C$_2$B$_{11}$H$_9$)$_2^-$, etc.

Useful weakly nucleophilic solvents include but are not limited to dichloromethane, 1,2-dichloroethane, 1,1',2,2'-tetrachloroethane, bromobenzene, chlorobenzene, 1,2-dichlorobenzene, various isomers of trichlorobenzene, α,α,α-trifluorotoluene, dichlorodifluoroethane and other freons, sulfur dioxide, nitrobenzene, etc. Low-polarity solvents suitable for use in the recrystallization procedures include but are not limited to hexane, hexanes (commercial mixture), pentane, heptane and other branched and straight chain alkanes, cyclohexane, decalins (cis and trans), benzene, toluene, xylene (all isomers), mesitylene, tetralin, carbon tetrachloride, etc.

Other Methods of Cation Formation

The disclosed separation protocols that are based on fullerene cation formation by oxidation can alternatively proceed with cation formation via addition of a cationic electrophile, such as a proton. Formation of empty fullerene and endohedral fullerene cations via protonation is a variant of the disclosed purification procedure that is applicable in a similar manner as the oxidation protocol. This is because endohedral fullerenes have a much lower protonation threshold than the empty fullerenes. Reed et al. (Reed, 2000(b)) have shown that C$_{60}$, perhaps the fullerene most difficult to protonate, can in fact be protonated under extreme conditions. Under far less drastic conditions using a much weaker acid, preliminary measurements (Tumanskii, 1998) indicate that La@C$_{82}$ and Y@C$_{82}$ likely can be protonated by trifluoroacetic acid. Thus, selective protonation of endohedral fullerenes intimately mixed with an excess of empty fullerenes is possible, allowing for a cationic purification procedure analogous to that described for oxidation but based on chemical protonation. Protonation can also be useful for separating the higher fullerenes as a group from the more abundant C$_{60}$ and C$_{70}$ because the higher fullerenes will protonate selectively under conditions milder than those needed to form HC$_{60}^+$ and HC$_{70}^+$. Fullerene cations formed by protonation can thus be separated from the unprotonated species via recrystallization, similar to how it is performed in the oxidative protocol. Oxidation of the neutral radical endohedrals does confer a slight advantage over protonation, however. One-electron oxidation of radical M@C$_{82}$ molecules forms closed shell species, whereas after protonation the resulting cation species may remain as a radical. Radicals are generally more reactive than closed shell species, so in certain cases a cationic purification method based on oxidation rather than protonation may be more desirable.

Protonation of endohedral metallofullerenes by a discrete acid is illustrated by Equation 2.

$$(M_m@C_{2n}) + [H^+][X^-] \rightarrow [H(M_m@C_{2n})^+][X^-] \qquad (2)$$

The acid [H$^+$][X$^-$] in Equation 2 is a protic (Brønsted) acid with a weakly coordinating counter-anion [X$^-$], with X$^-$ being but not limited to triflate, sulfate, perchlorate, hexfluoroantimonate, hexachloroantimonate, hexafluorophosphate, tetrafluoroborate, tetraarylborate and its various substituted fluorinated derivatives, tetrachloroaluminate, trifluoroacetate, carboranes of various compositions e.g. CB$_{11}$H$_6$X$_6^-$ (where X=H, F, Cl, Br, I, CH$_3$), CB$_{11}$(X)$_{12}^-$, (where X=F, Cl, CH$_3$), CB$_9$H$_{10}^-$, Co(C$_2$B$_{11}$H$_9$)$_2^-$, etc.

Besides protonation, other cationic electrophilic reagents R$^+$ (where R is an organic or inorganic functionality) can be incorporated into the cation formation protocol. Such reagents are reacted with endohedral metallofullerene species to form cations such as R(M$_m$@C$_{2n}^+$). Kitagawa (Kitagawa, 1999) has generated analogous RC$_{60}^+$ compounds in situ where R is a polychloroalkane moiety.

Separation Procedures

In one embodiment, the second fullerene and the fullerene cation are both substantially soluble in the solvent and fullerene cation is separated from the second fullerene by decreasing the polarity of the solvent to precipitate a salt of the fullerene cation and separating the fullerene cation salt precipitate from the solvent. The purification procedure of the invention exploits the solubility differences of cationic fullerene compounds and neutral fullerene compounds. Ionic compounds are soluble in solvents with a higher polarity and higher dielectric constants, whereas the opposite is generally true for neutral compounds. This can be used to separative advantage. Some solvents like o-dichlorobenzene (ODCB) are capable of dissolving fullerene anions, cations, and neutral species. When a non-polar solvent such as the hydrocarbon hexane is added to an ODCB solution of mixed fullerene neutral and cationic molecules, the polarity is reduced, causing the cations to precipitate as a solid salt while the majority of the neutrals remain in solution. It is noted that the solubility of empty fullerenes and endohedral fullerenes in common organic solvents is relatively low (on the order of milligrams per milliliter; Ruoff, 1993). Useful solvents for the present invention that dissolve fullerene anions, cations, and neutral species include, but are not limited to halobenzenes (ODCB, chlorobenzene, bromobenzene, etc.) and haloalkyls (e.g. 1,1,1',1' tetrachloroethane). Low-polarity solvents suitable for use in the recrystallization procedures include but are not limited to hexane, hexanes (commercial mixture), pentane, heptane and other branched and straight chain alkanes, cyclohexane, decalins (cis and trans), benzene, toluene, xylene (all isomers), mesitylene, tetralin, carbon tetrachloride, etc.

In another embodiment, the separation procedure is as follows. The first and second fullerene are substantially soluble in the solvent, the fullerene cation is substantially insoluble in the solvent, and the fullerene cation is separated from the second fullerene by precipitating a salt of the fullerene cation and separating the fullerene cation salt precipitate from the solvent. Useful solvents for this embodiment are non-polar organic solvents in which both the first and second fullerene are soluble. Suitable solvents include, but are not limited to, non-polar hydrocarbon (hexane, pentane, decalin, etc.) and arene (benzene, toluene, etc.) solvents.

In another embodiment, the separation procedure is as follows. The first and second fullerene are substantially insoluble in the solvent, the fullerene cation is substantially soluble in the solvent, and the fullerene cation is separated from the second fullerene by separating the insoluble second fullerene from the solvent. Useful solvents for this embodiment include, but are not limited to, at least moderately polar solvents (such as dichloromethane) which are capable of dissolving the fullerene cation.

Recovery of Neutral Fullerenes

Optionally, the fullerene cation can be returned to its neutral state following separation of the fullerene cation. A parent fullerene molecule can be recovered from an oxidized cation salt by a variety of chemically or electrochemically reductive methods. In any such reduction stoichiometry is controlled and a relatively weak reducing agent is utilized to minimize the chance of overreduction to the fullerene anion.

A parent fullerene molecule can be recovered from a protonated fullerene cation salt by reaction with base. Equation 3 describes a non-limiting example of such a neutralization procedure for a protonated fullerene cation salt.

$$[H(M_m@C_{2n})^+][X^-] + NaOH \rightarrow M_m@C_{2n} + [Na^+][X^-] + H_2O \qquad (3)$$

In the formula $M_m@C_{2n}$, M includes, but is not limited to the elements listed in Table 2. It is contemplated that the described processes will work for separating $M@C_{2n}$ where M is a three-electron donating metal such that the endohedral is formally $M^{3+}@C_{2n}^{3-}$. These species have the electronic structures outlined by the MO diagrams in FIG. 1. FIG. 1 is a comparison of the frontier orbital levels of $M@C_{82}^+$, $M@C_{82}$, and $M@C_{82}^-$ (where M is in its 3+state, donating 3 electrons as in the formalism $M^{3+}@C_{82}^{3-}$). The vertical scale is arbitrary in energy and in each diagram it is not to scale with respect to the others.

The electronic structures of $M_m@C_{2n}$ with metals donating other than three electrons to the fullerene cage are not as well understood, but the disclosed purification procedures are modifiable to accommodate these potentially different $M_m@C_{2n}$ species, demonstrated here by the separation of $Tm_m@C_{2n}$ endohedral fullerenes. The disclosed invention is applicable to the separation of mixed multi-element containing endohedral fullerenes. These include the endohedral species recently discovered (Stevenson, 1999), for example $Sc_3N@C_{80}$, $ErSc_2N@C_{80}$, $Er_2ScN@C_{80}$, $Er_3N@C_{80}$, and such. Modifications to accommodate such species include but are not limited to different oxidizing and reducing agents, different counter-anions, different solubilizing solvents, and different solvents of recrystallization. In the disclosed procedures, the oxidative generation of the endohedral metallofullerene cations can also be performed using bulk electrochemical techniques.

The disclosed purification procedures can also be applied to fullerene species other than the endohedral metallofullerenes $M_m@C_{2n}$. For example, cationic purification procedures can be applied to the separation of the higher fullerenes as a general class ($C_{2n}$ with $n \geq 38$) from the more abundant fullerenes $C_{60}$ and $C_{70}$ (in the absence or presence of endohedral fullerenes). The empty higher fullerenes as a group have oxidation potentials ranging from ca. +0.7 to +0.9 V, ca. 0.5 lower than the oxidation potentials of $C_{60}$ and $C_{70}$. Similarly, protonation of empty higher fullerenes will be easier than the corresponding protonations of $C_{60}$ or $C_{70}$. The addition of electrophilic reagents to empty fullerene mixtures is selective for the higher fullerenes because of their higher basicities as evidenced by lower ionization potentials and greater ease of one-electron oxidation. These two ways of forming higher fullerene cations (oxidation and protonation) serve as chemical handles for their separation as a group from the more abundant $C_{60}$ and $C_{70}$. Once oxidized or protonated, they can be recrystallized as ionic salts and separated from the non-cationic neutral $C_{60}$ and $C_{70}$ molecules, similar to the disclosed procedures outlined above and in Schemes 1 and 2. The produced material is then greatly enriched in only the higher fullerenes. This mixture of higher fullerenes is then amenable to further separation and isolation of individual fullerenes by standard chromatographic techniques (i.e. preparative HPLC) without interference from large amounts of $C_{60}$ and $C_{70}$. The absence of interfering $C_{60}$ and $C_{70}$ will greatly increase the efficiency of the chromatographic procedure by allowing higher starting solution concentrations of mixed higher fullerenes, larger HPLC injection volumes than normally feasible with mixtures containing predominantly $C_{60}$ and $C_{70}$, reduction in the number of repetitive recycling steps, and so on.

The purification and separation procedures outlined in this invention is also amenable to the separation of exohedrally derivatized fullerenes and heterofullerenes. Heterofullerenes are skeletally substituted fullerenes where one or more of the fullerene's constituent carbon atoms is replaced by another element of general formula $C_{(2n)-x}A_x$, as in $C_{59}N$, $C_{59}B$, etc. Such separations are useful to segregate these species from mixtures containing the unmodified starting materials. Typical preparations of exohedral $C_{60}$ derivatives, for example, convert only a portion of the starting $C_{60}$ to derivatized $C_{60}$ molecules leaving the product material as a difficult to separate intimate mixture of the desired $C_{60}$ derivative and unconverted $C_{60}$. This feature is in general true of any organic, inorganic, organometallic and hetero derivatization of fullerene molecules $C_{2n}$ and $M_m@C_{2n}$. Thus, a simple non-chromatographic purification method based on this disclosed invention for the separation of exohedral fullerene derivatives from underivatized fullerene molecules is of broad general utility. The site of oxidation or electrophilic addition to the fullerene derivative or heterofullerene may or may not be the exohedral substituent or the heteroatom, or it may alternatively by the remainder of the fullerene itself or any combination thereof. The particular details will depend entirely on the specific derivatized fullerene or heterofullerene, and in either case will not affect the applicability of the purification procedure. It will be equally applicable to endohedral fullerenes that simultaneously are exohedrally derivatized and/or are heterofullerenes.

Metal-containing endohedral fullerenes have important developing applications. To efficiently exploit these applications, larger amounts of endohedral metallofullerenes are needed than are currently available. Examples of applications that will benefit from the disclosed purification procedures include:

1. A contrast-enhancing agent for use in clinical Magnetic Resonance Imaging (MRI). MRI operates by imaging the water protons in vivo using the principles and technology of Nuclear Magnetic Resonance (NMR). When species possessing magnetic spin are introduced, those in proximity to water protons will decrease the relaxation times for those protons ($T_1$ and $T_2$), making them "stand out" relative to those water protons not under the paramagnetic influence. This influence can be outer-sphere or inner-sphere (via direct coordination of water molecules to paramagnetic metal ions). In general, metal ions with high magnetic moments (such as the lanthanide Gd) make the best relaxation agents. However, these ions are toxic if released directly into the bloodstream. Coordination chemistry has been used to minimize free Gd ions while still allowing the complex to act as a MRI relaxation agent. Endohedral Gd fullerenes have an inherent advantage over chelated metal coordination complexes because the endohedral metal is trapped in the interior of the fullerene; there is no equilibrium with an emptied-cage/free metal species. Thus, endohedral fullerenes are likely to be safer in vivo than conventional chelates, from the standpoint of the metal's toxicity.

Endohedral fullerenes containing magnetic metals can be purified as in the disclosed processes, and derivatized or otherwise modified for pharmaceutical usage. Primarily, derivatizations that introduce water solubility are required and many ways to accomplish this have been developed. The compounds can then be used in vivo to image internal organs and disease sites.

2. Nuclear medicine agents. Metal chelates of radioactive elements can be used as radiotracers or therapeutic sources of high-energy radioactive decay in vivo. Just like with the above MRI contrast enhancing agents, strong chemical chelators are used to keep the often toxic metal from circulating as a free ion. Also of concern with radionucleides is the potential ejection of the metal from the chelate following the energetic radioactive decay. Endohedral fullerenes will perform better than conventional chelates in both these regards, as the metal cannot dissociate and the cage structure may withstand certain types of decay events and product recoil. This will decrease the deleterious side effects of these nuclear medicine agents to the patient.

The disclosed purification methods work on radioactive-metal containing $M_m@C_{2n}$ produced by the following methods:
  arc synthesis with radioactive metal precursor(s) followed by purification, etc.
  neutron activation after manufacture/purification of endohedral species (Cagle, 1999).
  "ion implantation" of radioactive elements into the fullerene cage
  nuclear recoil implantation via activation of interstitially embedded elements in solid fullerene lattices.

Applications for the endohedral metallofullerene radiopharmaceuticals include radiotracers (possibly capable of crossing the blood-brain barrier) for nuclear imaging, therapeutics (with the possibility of targeting via attached functionalities) and as components in fullerene coatings of medical prosthetic devices.

Another pharmaceutical application for endohedral metallofullerenes is use as generators of singlet oxygen (Tagmatarchis, 2001), which can be used therapeutically in vivo to treat disease.

EXAMPLE 1

Oxidative Separation and Purification of $Gd@C_{82}$

The separation and purification of $Gd@C_{82}$ is presented as a representative separation of a typical $M@C_{82}$ species from the mixture of fullerene materials produced by arc-discharge of metal impregnated graphite rods. $Gd_2O_3$ impregnated graphite rods are arced as the anode in carbon-arc style fullerene reactor under standard conditions (ca. 30 V DC, 160 A, 150 torr He gas). The produced fullerenes and metallofullerenes contained in the raw soot are sublimed overnight at about 750° C. under vacuum (about $1\times10^{-3}$ torr) onto a water-cooled condenser. This condenser is removed from the arc apparatus anaerobically and introduced into an inert atmosphere glove box, where the sublimed mixed fullerenes and Gd-containing endohedral metallofullerenes are scraped from the condenser and collected. Typical yields of this sublimate material vary from 400 to 700 mg, derived from arcing three $Gd_2O_3$ impregnated graphite rods in the present arc reactor. This mixed empty fullerene/Gd metallofullerene sublimate is then subjected to the purification procedure developed for purifying $M@C_{82}$ as outlined in Scheme 1. The entire purification procedure is performed anaerobically (absence of oxygen and water) in an argon-filled inert atmosphere glove box. Each precipitation step of Scheme 1 inevitably includes some undesired empty fullerenes ($C_{60}$, $C_{70}$, and higher fullerenes) simply because they are present in such greater quantities than the endohedral fullerenes. However, each successive recrystallization step enriches the quantity of metallofullerene such that by the final step there are no empty fullerenes remaining.

Figure 2:
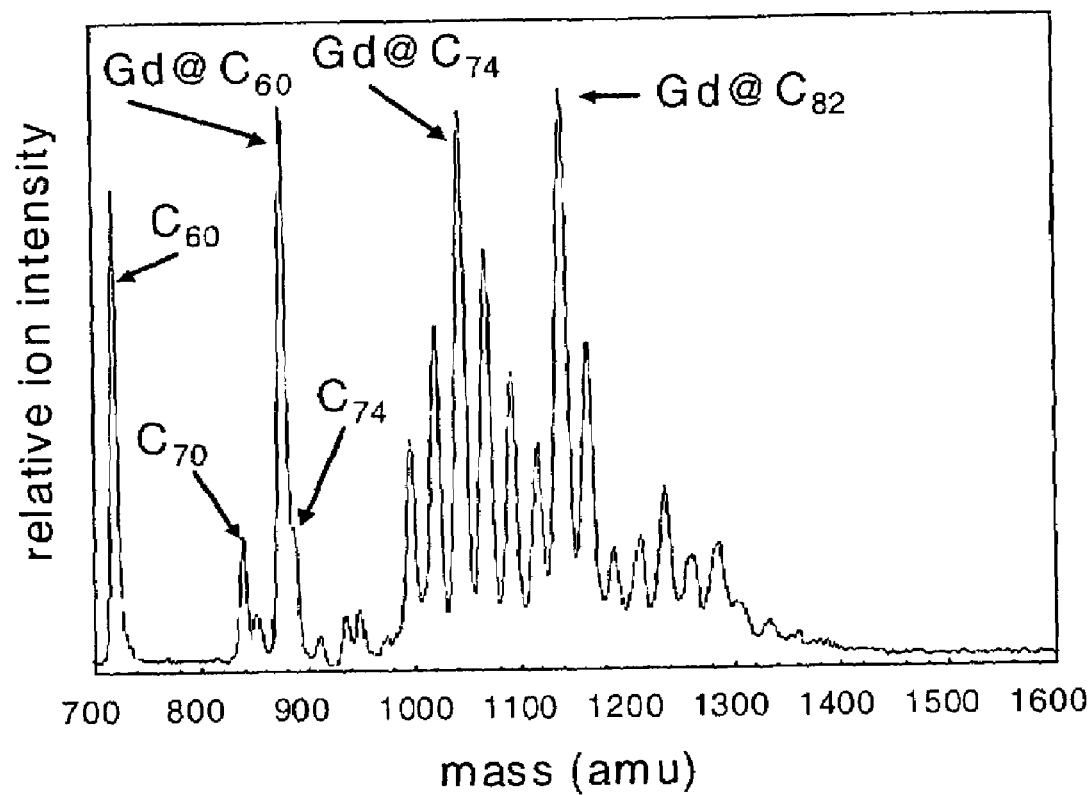
FIG. 2 shows a LD-TOF MS of mixed Gd-endohedral fullerene sublimate.

FIG. 2 is a typical LD-TOF MS (laser desorption time-of-flight mass spectrum) of the anaerobically collected sublimate, showing the broad mixture of empty and endohedral Gd-metallofullerenes. Sublimate (300 mg) is stirred vigorously overnight in o-dichlorobenzene (ODCB) (10 ml), and then filtered through a 45 μm filter. The insoluble material removed by this filtration contains a mixture of endohedral Gd-metallofullerene species $Gd@C_{60}$, $Gd@C_{70}$, higher $Gd@C_{2n}$ (primarily with n≠41), as well as the empty the small-bandgap fullerene $C_{74}$ and small amounts of other empty fullerenes $C_{2n}$ (n≧30). The soluble filtrate contains $Gd@C_{82}$ along with comparatively large amounts of empty fullerenes $C_{2n}$ (n≧30, n≠37) in ODCB.

The first redox step of the procedure (Scheme 1) to separate $Gd@C_{82}$ from the other empty fullerenes present in greater abundance is that shown in Equation 4. To the $Gd@C_{82}$ and empty fullerenes $C_{2n}$(n≧30, n≠37) in ODCB solution is added 25 mg of the oxidant $[Ag^+][SbF_6^-]$; this mixture is stirred vigorously for three hours. $[Ag^+][SbF_6^-]$ in ODCB is of sufficient oxidizing strength to remove an electron from $Gd@C_{82}$, producing its monocation as the hexafluoroantimonate salt and solid Ag by-product. The predominantly abundant fullerenes $C_{60}$ and $C_{70}$ remain neutral molecules as their potentials for oxidation are too high for $Ag^+$ to remove an electron from them. Other empty fullerenes (e.g., $C_{76}$, $C_{78}$, $C_{84}$, etc.) that have medium to high (4)

oxidation potentials also remain uncharged molecules. The soluble mixture of empty fullerenes and the $[Gd@C_{82}^+][SbF_6^-]$ salt are then filtered to remove the Ag metal.

Scheme 1

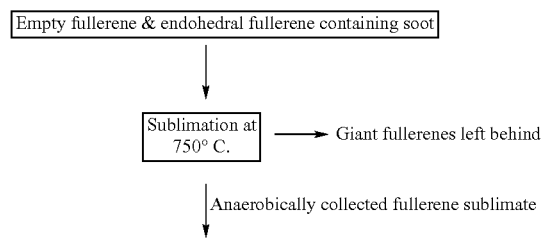

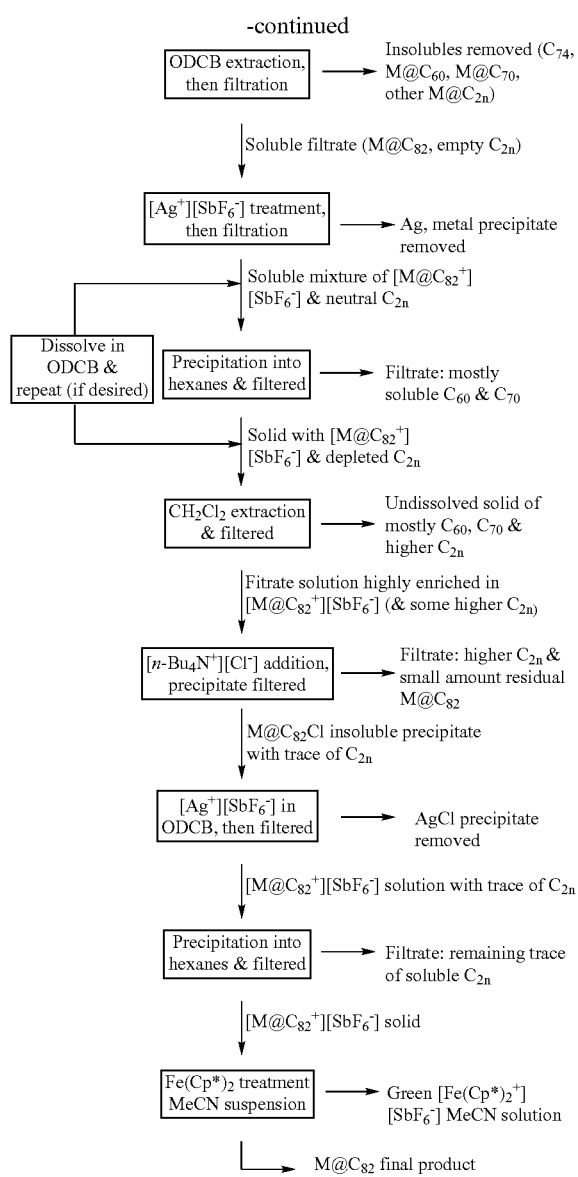

The solubles are next recrystallized by addition of an excess volume of a nonpolar solvent such as hexanes. The ODCB solution is added dropwise to rapidly stirring alkane solvent (100 mL total volume of hexanes, cyclohexane, or a mixture of cyclohexane containing 5–20% decalins). The large volume of nonpolar alkane solvent as compared to the volume of ODCB drastically decreases the solvent polarity and reduces the solubilizing ability of the initial ODCB solution such that the ionic salts $[Gd@C_{82}{}^+][SbF_6{}^-]$ (and any other oxidized fullerene radical cation salts if present) rapidly precipitate from solution. Most of the neutral fullerenes remain in solution in this mixed ODCB/hexanes solvent. Small amounts of the empty fullerenes do however precipitate along with the ionic salt. This is because the overall solubility of the empty fullerenes is lower in this mixed solvent than in pure ODCB. This step concentrates the available $Gd@C_{82}$ by removing a large portion of empty fullerenes. The mixture is stirred for one hour and filtered through a 45 μm filter. The filtered solid is rinsed with additional alkane solvent (10 to 50 mL).

This solid contains fullerene material enriched in $Gd@C_{82}{}^+$ (as its $SbF_6{}^-$ salt) combined with some empty fullerenes that are reduced in amount as compared to the starting material. The soluble filtrate which passed through the filter contains a mixture empty fullerenes along with a trace of $Gd@C_{82}$ in the ODCB/alkane solvent mixture. This precipitation process (i.e. recrystallization) can be cycled through several iterations to further enrich the content of the $Gd@C_{82}$ if desired (Scheme 1). In such case, the filtered solid is re-dissolved in a minimum volume of ODCB (5 to 10 mL) and re-precipitated into rapidly stirring alkane solvent (50 to 75 mL), filtered, and washed with alkane solvent as before. While this recrystallization does enrich the precipitate's $Gd@C_{82}{}^+$ content relative to empty fullerenes, it does slightly diminish the yield of $Gd@C_{82}{}^+$ in the product because a small amount of neutral $Gd@C_{82}$ gets washed into the filtrate, likely produced via one-electron reduction of $Gd@C_{82}{}^+$ by trace amounts of water and other nucleophilic impurities present in the ODCB and alkane solvents. Because the total percentage of $Gd@C_{82}$ in the sublimate is low (ca. 1%), it is desirable to minimize manipulations that diminish the overall content of it in each step of the purification process.

In the next step, the precipitated solids enriched in $Gd@C_{82}{}^+$ are vigorously stirred in dichloromethane solvent. Dichloromethane is a solvent with sufficient polarity to dissolve fullerene cations having appropriate weakly coordinating counter-anions, but it is a comparatively poor solvent for neutral fullerene molecules. Thus, stirring the precipitate as a mixture with dichloromethane extracts primarily the soluble $Gd@C_{82}{}^+$ along with a small quantity of empty fullerenes.

In the next step (Equation 5), anion metathesis is performed to swap the weakly coordinating $SbF_6{}^-$ anion of the $[Gd@C_{82}{}^+][SbF_6{}^-]$ salt to the more strongly coordinating chloride (Cl$^-$). To the dichloromethane solution is added an excess quantity of tetra-n-butylammonium chloride ([n-Bu$_4$N$^+$][Cl$^-$]). In CH$_2$Cl$_2$, the addition of soluble [n-Bu$_4$N$^+$][Cl$^-$] to the $[Gd@C_{82}{}^+][SbF_6{}^-]$/empty fullerene mixture causes immediate precipitation of the insoluble $Gd@C_{82}Cl$ complex. The empty fullerenes are not affected by the presence of Cl$^-$ and remain in solution, along with the metathesis product [n-Bu$_4$N$^+$][SbF$_6{}^-$] and any excess [n-Bu$_4$N$^+$][Cl$^-$]. The insoluble $Gd@C_{82}Cl$ is removed by filtration and rinsed with CH$_2$Cl$_2$.

(5)

To recover free $Gd@C_{82}$ from the $Gd@C_{82}Cl$, the chloride is first removed. This is accomplished according to Equation 6. [Ag$^+$][SbF$_6{}^-$] now acts as a Cl$^-$ trap. It is mixed with $Gd@C_{82}Cl$ in ODCB (a solvent in which both species are soluble), resulting in production of soluble $[Gd@C_{82}{}^+]$[SbF$_6{}^-$] and in rapid precipitation of insoluble AgCl. The solution is filtered to remove AgCl and recrystallized with hexanes to give solid $[Gd@C_{82}{}^+][SbF_6{}^-]$ of enriched purity. In the recrystallization process, solid $[Gd@C_{82}{}^+][SbF_6{}^-]$ is recovered by dropwise addition of this ODCB filtrate to rapidly stirring hexanes. The insoluble $[Gd@C_{82}{}^+][SbF_6{}^-]$ is removed by filtration and washed with hexanes.

(6)

Figure 3:
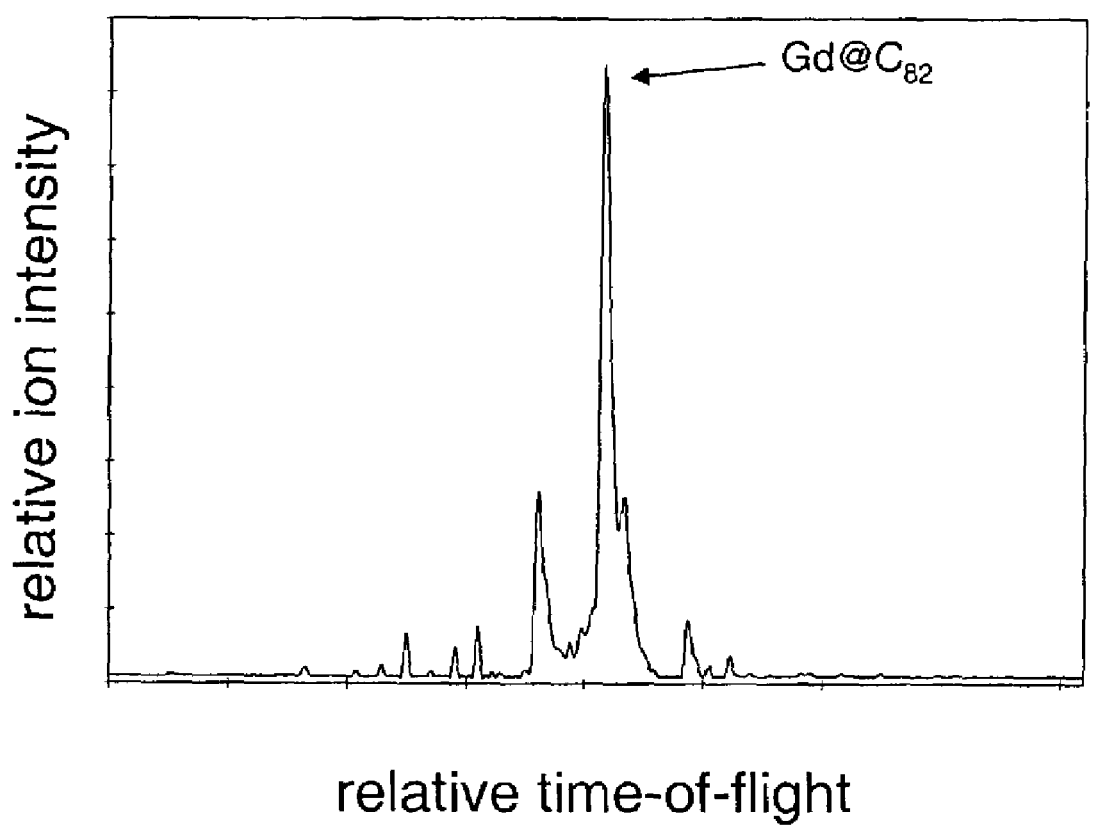
FIG. 3 shows a LD-TOF MS of $Gd@C_{82}$ separated according to Scheme 1.
Figure 4:
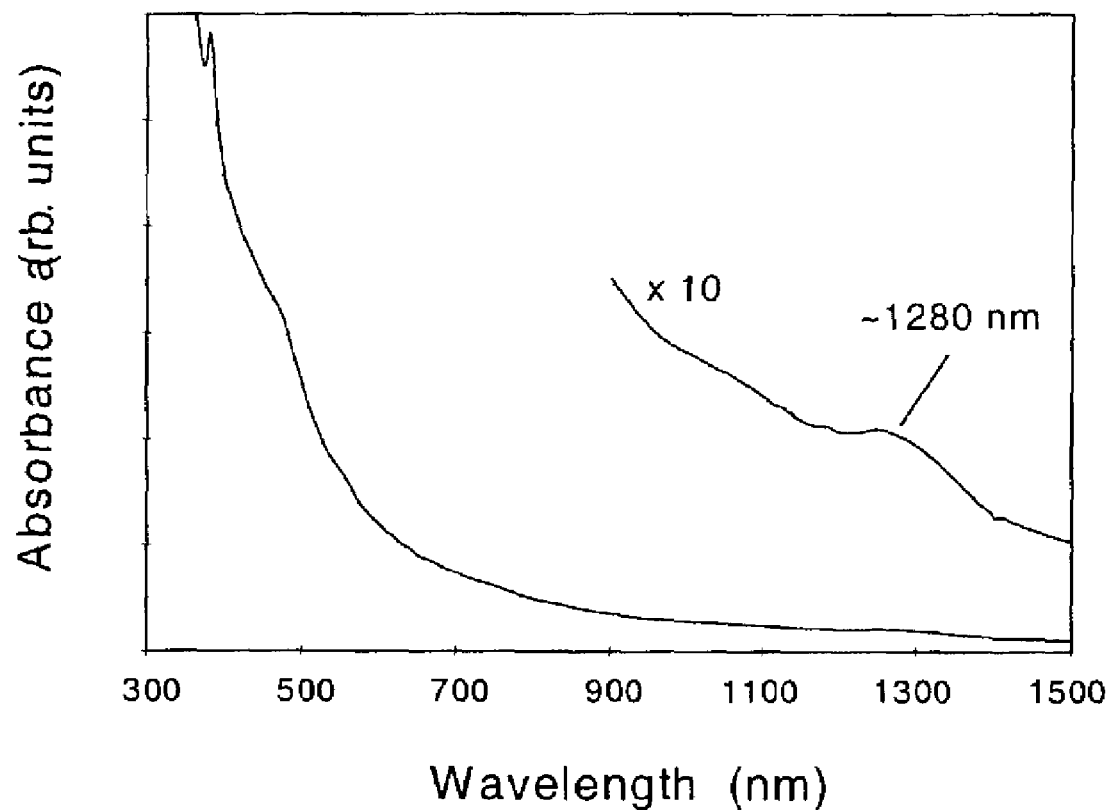
FIG. 4 shows a Vis-NIR electronic absorption spectrum of $Gd@C_{82}^+$ in ODCB solution.
Figure 5:
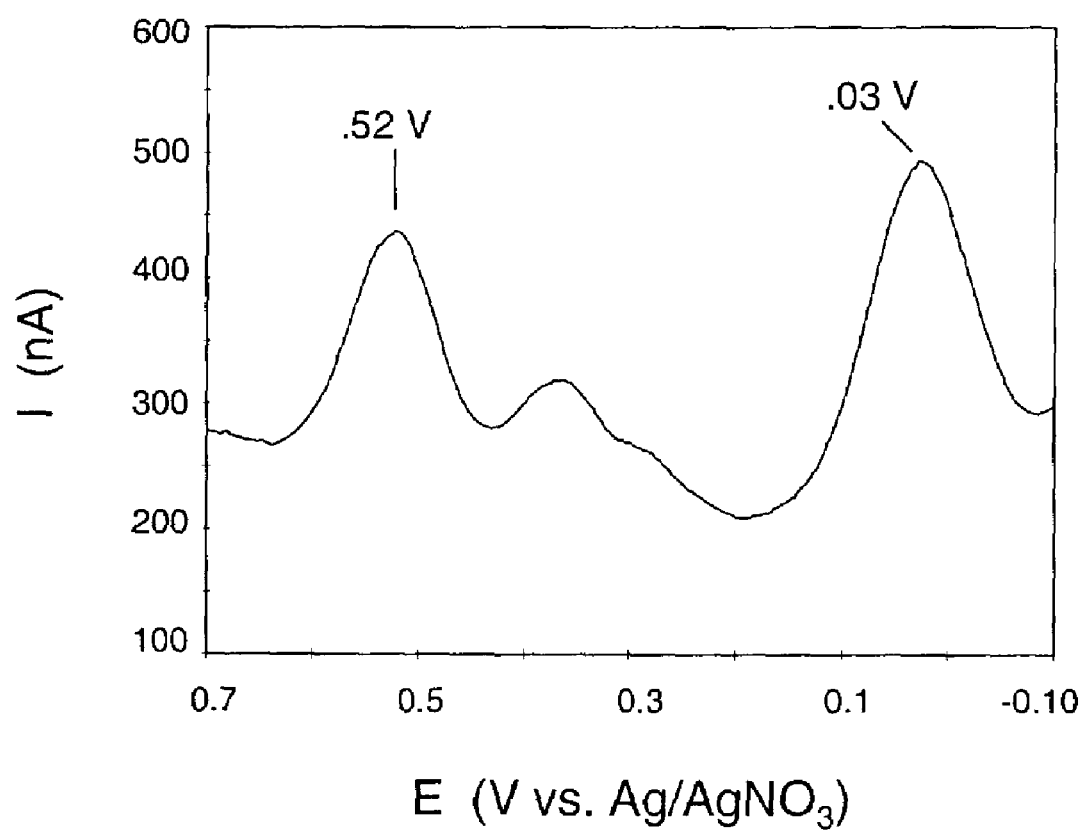
FIG. 5 shows a differential pulse voltammogram of $Gd@C_{82}^+$ in ODCB solution.

The resulting solid salt [Gd@$C_{82}^+$][$SbF_6^-$] is essentially free of empty fullerene contaminants as shown by the LD-TOF MS in FIG. 3. The material analyzed in FIG. 3 is from a preliminary test of the purification procedure and as such contains small quantities of non-Gd@$C_{82}$ impurities. Subsequent application of the purification method of Scheme 1 produces Gd@$C_{82}$ material of higher purity. FIG. 4 shows the electronic absorption spectrum of an ODCB solution containing Gd@$C_{82}$+, displaying its characteristic NIR $\lambda_{max}$ at ca. 1280 nm (Akasaka, 2000(a)). FIG. 5 is a differential pulse voltammogram (DPV) of purified Gd@$C_{82}^+$ in ODCB. The +1/0 redox couple is observed at +0.52 V (vs. Ag/AgNO$_3$ in this system) and the 0/−1 redox couple is seen at +0.03 V, corresponding to an "electrochemical gap" of 0.5 V, in agreement with the literature value (Suzuki 1996). Also visible in between these redox peaks are the corresponding redox events of a likely minor structural isomer of Gd@$C_{82}$ (in analogy to Pr@$C_{82}$, Akasaka, 2000(b)).

The [Gd@$C_{82}^+$][$SbF_6^-$] can then be used in further chemical study as is or reduced by one electron to the neutral species Gd@$C_{82}$ if desired. There many chemical methods by which this can be achieved. In any such reduction stoichiometry is controlled and a relatively weak reducing agent is utilized to minimize the chance of overreduction to the anion Gd@$C_{82}^-$. This reduction can be performed in several ways, one of which is described by Equation 7. A reducing agent donates one electron to [Gd@$C_{82}^+$][$SbF_6^-$] producing neutral Gd@$C_{82}$. Decamethylferrocene, Fe(CP*)$_2$, with an E° of ca. −0.5 V (vs the ferrocene standard) is a widely available weak reducing agent (Connelly, 1996) capable of performing this reduction. One useful reduction protocol is to stir a suspension of the salt [Gd@$C_{82}^+$][$SbF_6^-$] in acetonitrile, in which it is insoluble, with one equivalent of decamethylferrocene, (i.e. bis(pentamethyl-cyclopentadienyl)iron, Fe(CP*)$_2$ where Cp* is the pentamethylcyclopentadienyl anion). Fe(CP*)$_2$ has sufficient solubility in acetonitrile to effect a one-electron reduction of [Gd@$C_{82}^+$][$SbF_6^-$] to Gd@$C_{82}$ and [Fe(Cp*)$_2^+$][$SbF_6^-$]. This mixture is stirred vigorously, producing a green solution of [Fe(Cp*)$_2^+$][$SbF_6^-$] ($\lambda_{max}$=783 nm) and a suspension of insoluble Gd@$C_{82}$, which is removed by filtration and rinsed with more acetonitrile, giving a final yield of 1 to 2 mg of Gd@$C_{82}$. Because the starting material [Gd@$C_{82}^+$][$SbF_6^-$] is insoluble in acetonitrile, the conversion efficiency to Gd@$C_{82}$ in the preceding procedure is likely not 100%. For most chemical manipulations of Gd@$C_{82}$, this does not pose any problems.

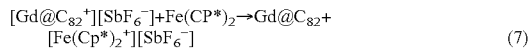
(7)

When desired, an alterative procedure for the one-electron reduction of [Gd@$C_{82}^+$] to Gd@$C_{82}$ can be performed. Solid [Gd@$C_{82}^+$][$SbF_6^-$] (5 mg) is dissolved in a minimum of ODCB (1 to 5 ml). One equivalent of Fe(CP*)$_2$ is added to this ODCB solution, with stirring. One electron reduction immediately occurs, forming Gd@$C_{82}$ and [Fe(Cp*)$_2^+$][$SbF_6^-$], which remain in OCDB solution. This mixture is then added dropwise to vigorously stirring hexanes (50 mL) to precipitate the Gd@$C_{82}$ and a minimum of the [Fe(Cp*)$_2^+$][$SbF_6^-$]. The filtered solid precipitate is rinsed with acetonitrile to remove remaining [Fe(Cp*)$_2^+$][$SbF_6^-$], resulting in the final product of solid Gd@$C_{82}$. Important to note is that the recrystallization strategy of Scheme 1 was attempted in the absence of added oxidant in separate experiments. This effected partial enrichment of Gd@$C_{82}$ relative to the empty fullerenes because of its slightly lower solubility in mixed polar/nonpolar solvents. It was however not as successful as the oxidative based procedure outlined by Scheme 1.

An alternate method is to suspend solid [Gd@$C_{82}^+$][$SbF_6^-$] in MeCN (in which it is insoluble) and stir it with one equivalent of Fe(CP*)$_2$. Very quickly the solution turns green from the production of [Fe(Cp*)$_2^+$][$SbF_6^-$] (confirmed by UV-Visible spectroscopy, $\lambda_{max}$=783 nm). This is stirred for several hours, filtered, and the filtered solid Gd@$C_{82}$ is washed with MeCN. Because the solid [Gd@$C_{82}^+$][$SbF_6^-$] is not soluble in MeCN, the conversion efficiency of [Gd@$C_{82}^+$][$SbF_6^-$] to Gd@$C_{82}$ is probably not 100% in this case. This process, however, is simple and effective enough for most practical end uses of Gd@$C_{82}$. This reduction can be performed under various conditions, as known to those of ordinary skill in the art, not limited to the illustrative examples herein.

The procedure disclosed above for separating Gd@$C_{82}$ from empty fullerenes is summarized by Scheme 1. The exact conditions used in Scheme 1 are not limiting, however.

EXAMPLE 2

Oxidative Separation and Purification of "Easily Oxidizable" $M_mC_{2n}$ Including $Gd_m$@$C_{2n}$ Scheme 2 illustrates a modification to the procedure outlined in Scheme 1. Scheme 2 outlines the procedure for extracting and purifying a larger class of endohedral metallofullerenes, $M_m$@$C_{2n}$, as opposed to the extraction of only the M@$C_{82}$ species in Scheme 1. This modification is the incorporation of the [Ag$^+$][$SbF_6^-$] oxidant during the OCDB extraction of the mixed fullerene/endohedral fullerene sublimate. This enables in situ oxidation and extraction into solution of otherwise insoluble endohedral species M@$C_{2n}$ and multiple-metal containing $M_m$@$C_{2n}$ species.

For example, the procedure of Scheme 1 can be modified to produce a final product containing not only Gd@$C_{82}$, but a variety of Gd endohedral metallofullerenes $Gd_m$@$C_{2n}$ during the initial step of ODCB extraction of the sublimate (Scheme 2). The presence of the oxidant at this stage effects the extraction of the otherwise ODCB insoluble $Gd_m$@$C_{2n}$ species (converted to cations by the oxidant) along with Gd@$C_{82}$ which is soluble both as a neutral and as a cationic species in ODCB (Equation 8). The purification procedure of the $Gd_m$@$C_{2n}^+$ material then proceeds in a manner similar to that used for Gd@$C_{82}^+$ (Scheme 1), as outlined in Scheme 2.

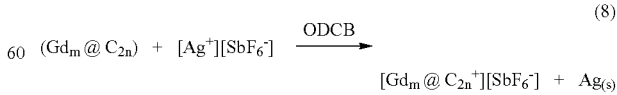
(8)

Figure 6:
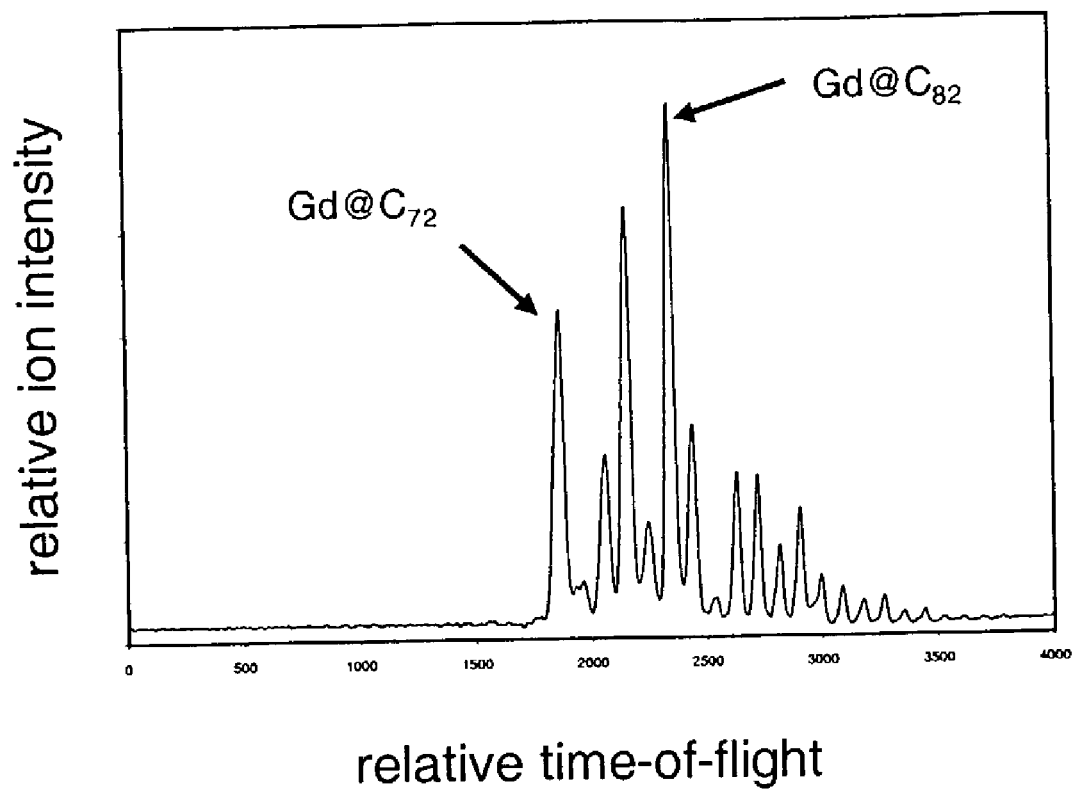
FIG. 6 shows a LD-TOF MS of $Gd_m@C_{2n}$ separated according to Scheme 2.
Figure 7:
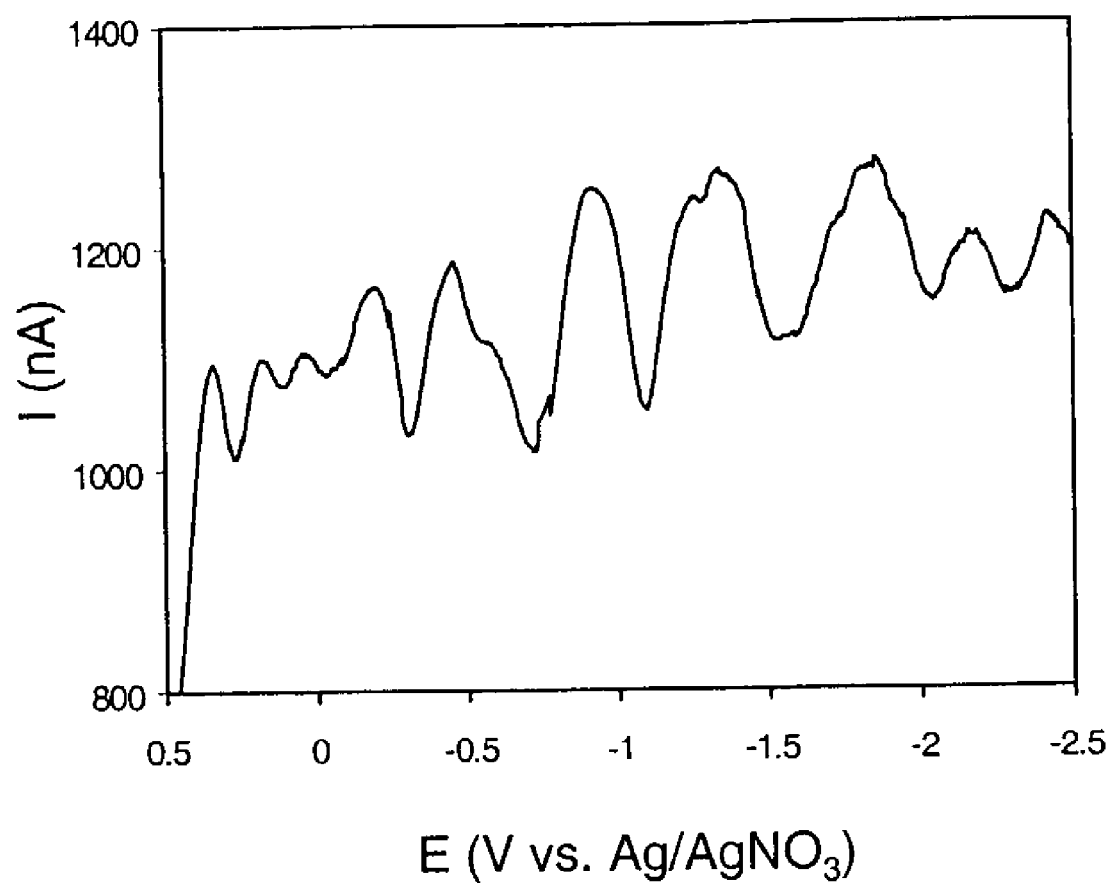
FIG. 7 shows a differential pulse voltammograom of $Gd_m@C_{2n}$ in ODCB solution.

The end solid product is a mixture of endohedral Gd-metallofullerenes $Gd_m$@$C_{2n}$, n≧36, containing very small amounts of empty fullerenes. The procedure illustrated in Scheme 2 was performed on fullerene materials produced by arc-discharge of metal impregnated graphite rods as described in Example 1. FIG. 6 shows the LD-TOF MS of the purified $Gd_m@C_{2n}$ material. FIG. 7 is the DPV of $Gd_m@C_{2n}$ in ODCB, displaying the rich number of redox events in this mixed Gd endohedral material.

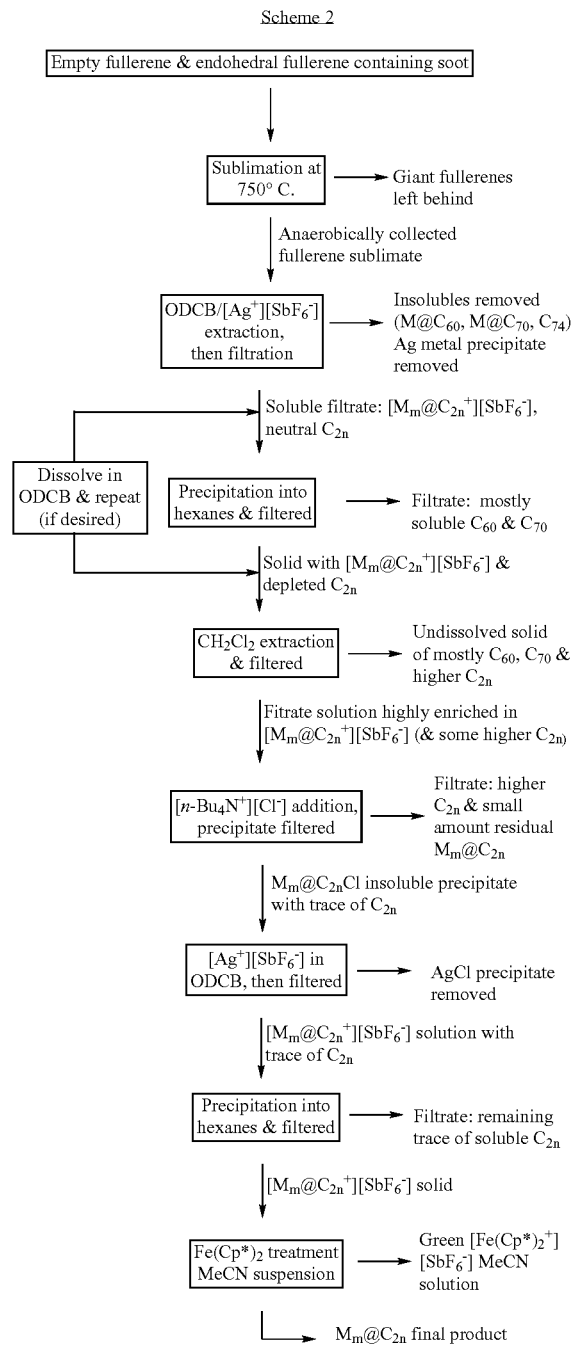

Figure 8:
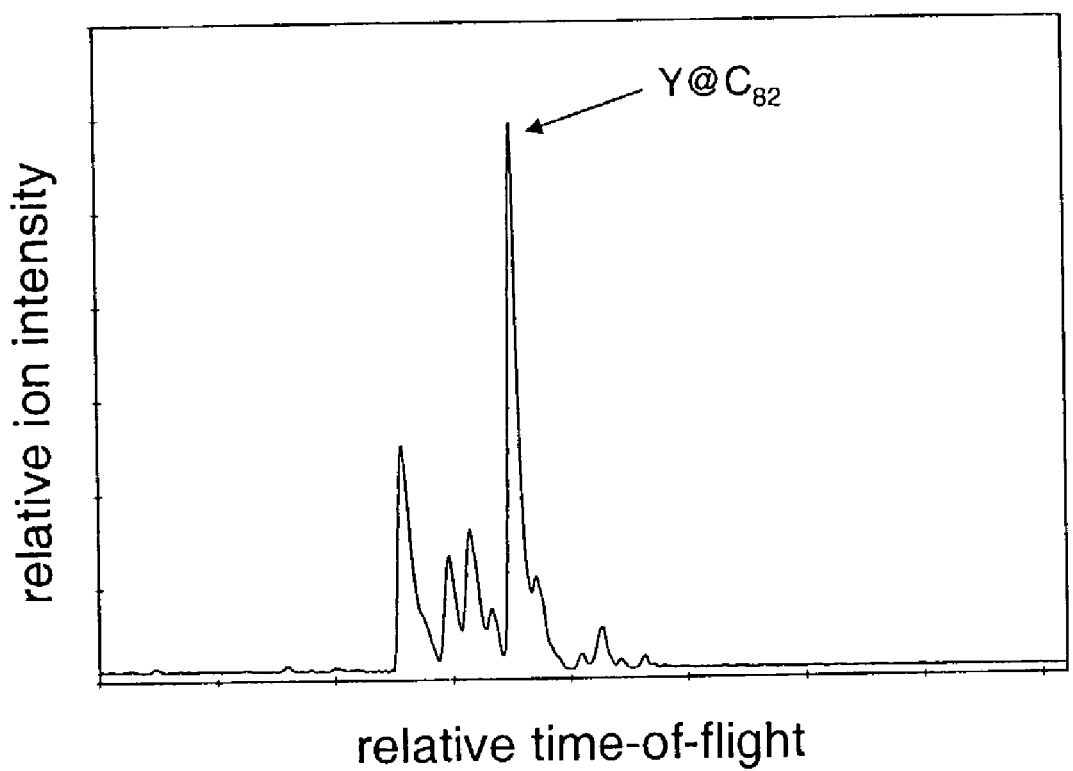
FIG. 8 shows the LD-TOF MS of $Y_m@C_{2n}^+$ separated according to Scheme 2.
Figure 9:
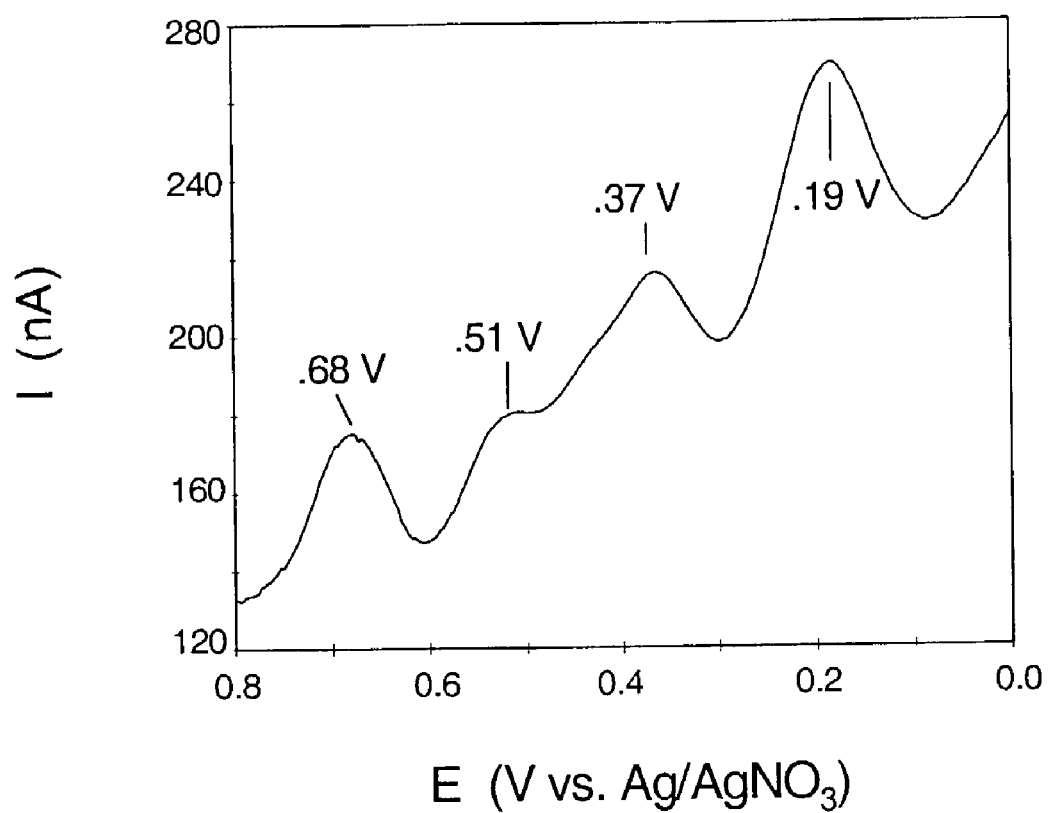
FIG. 9 shows a differential pulse voltammogram Of $Y_m@C_{2n}^+$ in ODCB solution.

The separation procedures of Schemes 1 and 2 were also performed on endohedral metallofullerenes containing metals other than Gd. Examples include $Y_m@C_{2n}$, $La_m@C_{2n}$ and $T_m@C_{2n}$ endohedral metallofullerenes. Y is an example of a metal that forms species formally denoted as $M^{3+}@C_{2n}^{3-}$, like Gd does. FIG. 8 shows the resulting $Y_m@C_{2n}$ material obtained from this sublimate after applying the Scheme 2 process to it. FIG. 9 shows a partial DPV of this $Y_m@C_{2n}$ purified material in ODCB (in agreement with the literature for $Y@C_{82}$ isomers, Suzuki, 1996; Akasaka, 2000(b)).

Many of these non-$M@C_{82}$ $M_m@C_{2n}$ species are highly insoluble as neutrals and thus this process increases the total yield of extractable metallo-endohedral fullerenes. This is particularly valuable since the yield of metallofullerenes is such a small portion of the total fullerene species production. The ensuing purification of the mixed $M_m@C_{2n}$ species (Scheme 2) proceeds with the same protocol as used for $M@C_{82}$ (Scheme 1).

Scheme 2 can also be modified as follows, to decrease the number of steps but also lowering the extraction efficiency of $M_m@C_{2n}$. Instead of performing the ODCB/$Ag^+$ extraction/recrystallization steps, the process may begin with a direct $CH_2Cl_2$/$Ag^+$ extraction of the sublimate. This solubilizes $M_m@C_{2n}$ species as cations without the prior steps, but the total extracted endohedral yield is lowered due to the trapping of endohedral species in the sublimate matrix of empty fullerenes, which have low solubility in $CH_2Cl_2$.

In separate experiments, the above two disclosed procedures were conducted on Gd-fullerene soots and sublimates entirely in air, not under the anaerobic conditions used in Schemes 1 and 2. In these experiments, it was found that while the purification processes do achieve the desired separations, their efficiencies are greatly reduced. This is likely because of the air (oxygen and/or water) sensitivity of the oxidized and neutral $M_m@C_{2n}$ species. This air sensitivity is complicated by the overall low content of endohedral fullerenes in the products of the carbon arc. Given a new production method, with a higher endohedral production efficiency than the carbon arc delivers, air exposed versions of Schemes 1 and 2 may be feasible.

A further modification to the disclosed protocols of Schemes 1 and 2 (which exploit the formation of the mono-cations $M@C_{82}^+$ and $M_m@C_{2n}^+$) is the formation of higher charged cationic species, e.g. $M@C_{82}^{x+}$ and $M_m@C_{2n}^{x+}$, where x=2, 3, etc. Suzuki et al. (Suzuki, 1996) and Akasaka et al. (Akasaka, 1996) have presented electrochemical evidence for the transient formation of $M@C_{82}^{2+}$ dication species at potentials near 1.1 V vs. ferrocene. Chemical formation of higher charged cations would require stronger oxidants than those of Schemes 1 and 2, as well as very weakly nucleophilic anions and solvents. Such conditions in fact are similar to those used to form discrete salts of $C_{60}^+$ and $C_{70}^+$ (Bolskar, 1997; Reed, 2000(b)). A major advantage of dications is their low solubility due to their high ionic charge. In this modification, oxidizing conditions are used which produce a mixture of endohedral $M_m@C_{2n}^{2+}$ species together with empty $C_{2n}$ and $C_{2n}^+$ species; the endohedral dications are then be selectively precipitated and recrystallized to effect their separation from the empty fullerenes analogous to the protocols of Schemes 1 and 2.

EXAMPLE 3

$M@C_{60}$, $M@C_{70}$, and $M@C_{74}$

Figure 10:
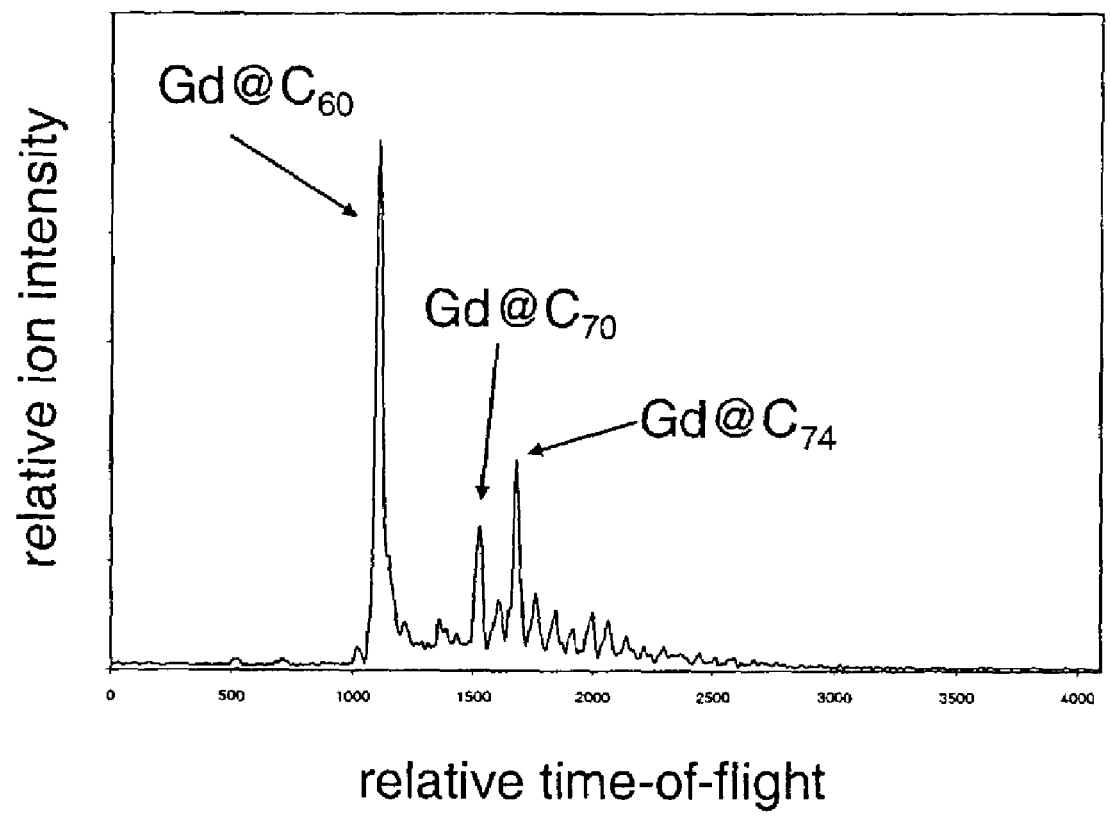
FIG. 10 shows a LD-TOF MS of insoluble $Gd@C_{2n}$ separated according to Scheme 3.

There is significant metallofullerene containing material from the sublimate remaining after the processes of Scheme 1 ($M@C_{82}$ separation) and Scheme 2 (easily oxidizable (with trivalent-M) $M_m@C_{2n}$ separation) are conducted on it. A third class of endohedral metallofullerene separable from the sublimate are the $M@C_{2n}$ species such as $M@C_{60}$, $M@C_{70}$, and $M@C_{74}$, which are in general insoluble in solvents and not easily oxidizable to soluble cations. In the case of trivalent-M containing metallofullerenes, for example as with Gd metallofullerenes, this third class of material is like that shown in FIG. 10. The major constituent is Gd@$C_{60}$. Also present by nature of having similar properties as these insoluble Gd$_m$@$C_{2n}$ endohedrals are empty insoluble small bandgap fullerenes like $C_{74}(D_{3h})$ and $C_{80}(I_h)$ etc.

Figure 11:
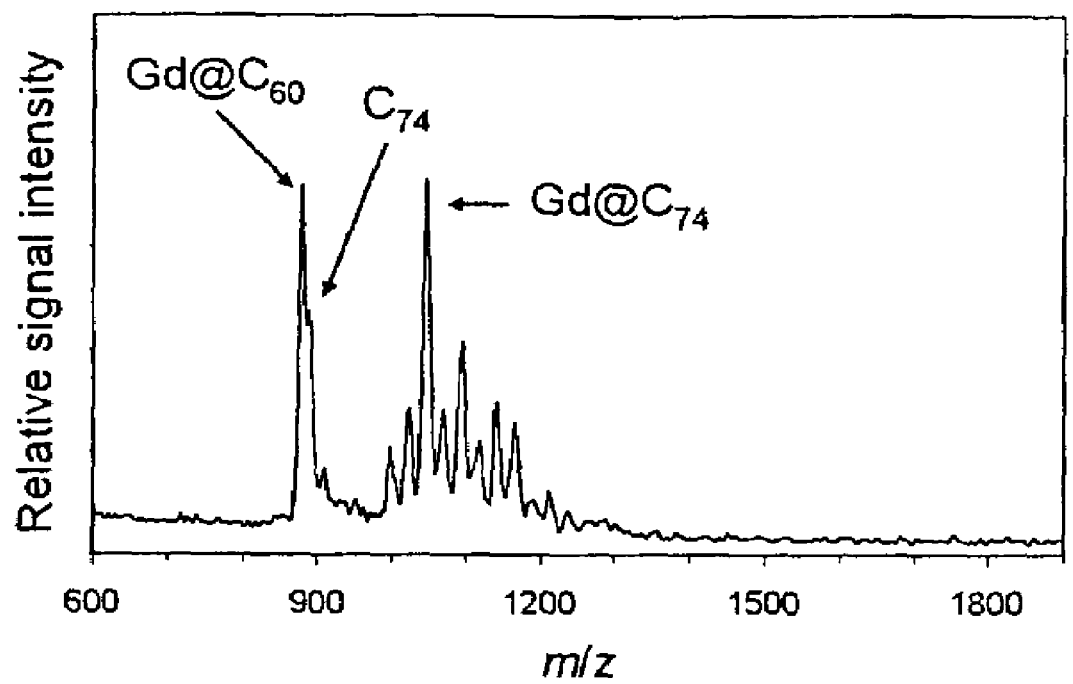
FIG. 11 shows a LD TOF-MS of ODCB-insoluble $Gd@C_{60}$ class.
Figure 12:
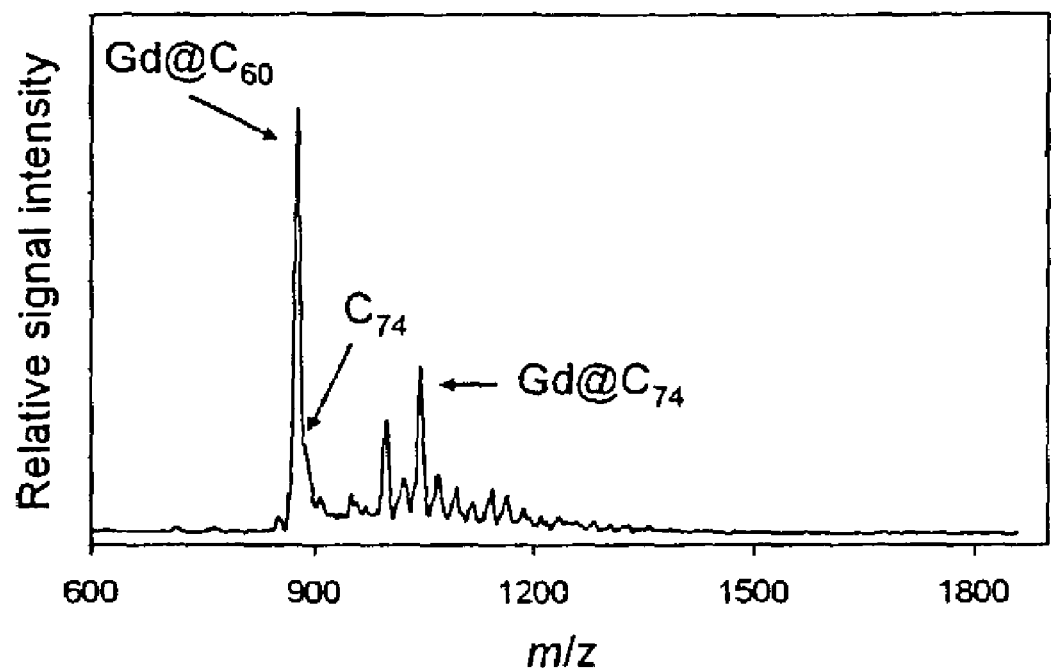
FIG. 12 shows a LD TOF-MS of the $AlCl_3$-treated ODCB-insoluble $Gd@C_{60}$ class.

The amounts of these empty $C_{2n}$ fullerenes can be diminished by oxidation with mild oxidants like those of Scheme 2. Aluminum trichloride is useful as an oxidant for this in non-reactive solvents like ODCB. FIG. 11 shows a mass spectrum of the Gd@$C_{60}$ class prior to the oxidative depletion of insoluble empty $C_{2n}$ fullerenes like $C_{74}$. Depletion of the empty small-bandgap fullerene $C_{74}$ and other Gd@$C_{2n}$ (2n≧72) from this material is accomplished by treatment with excess $AlCl_3$ in ODCB, producing a dark brown solution. The insolubles were filtered off, rinsed with ODCB and $CH_2Cl_2$ (to remove excess $AlCl_3$), followed by hexane rinsing, and dried under vacuum. The resulting material as shown in FIG. 12 (similar to the material shown in FIG. 10) is now depleted of ca. 50% of the $C_{74}$ (by estimating mass spectral peak area in comparison to FIG. 11). Note the very low level of $C_{60}$, $C_{70}$, etc., small amounts of which may be physically trapped in the solid matrix of insoluble Gd@$C_{60}$ and thus are not accessible for extraction. The insoluble class of trivalent-lanthanide containing M$_m$@$C_{2n}$, as shown here with the example of the Gd@$C_{60}$ class, is purified by removal of all the other material that can be solubilized either as neutral molecules or as cationic molecules. Scheme 3 presents an overall outline for the general separation procedure for all the three classes of endohedral metallofullerenes starting from mixed sublimate.

Figure 13:
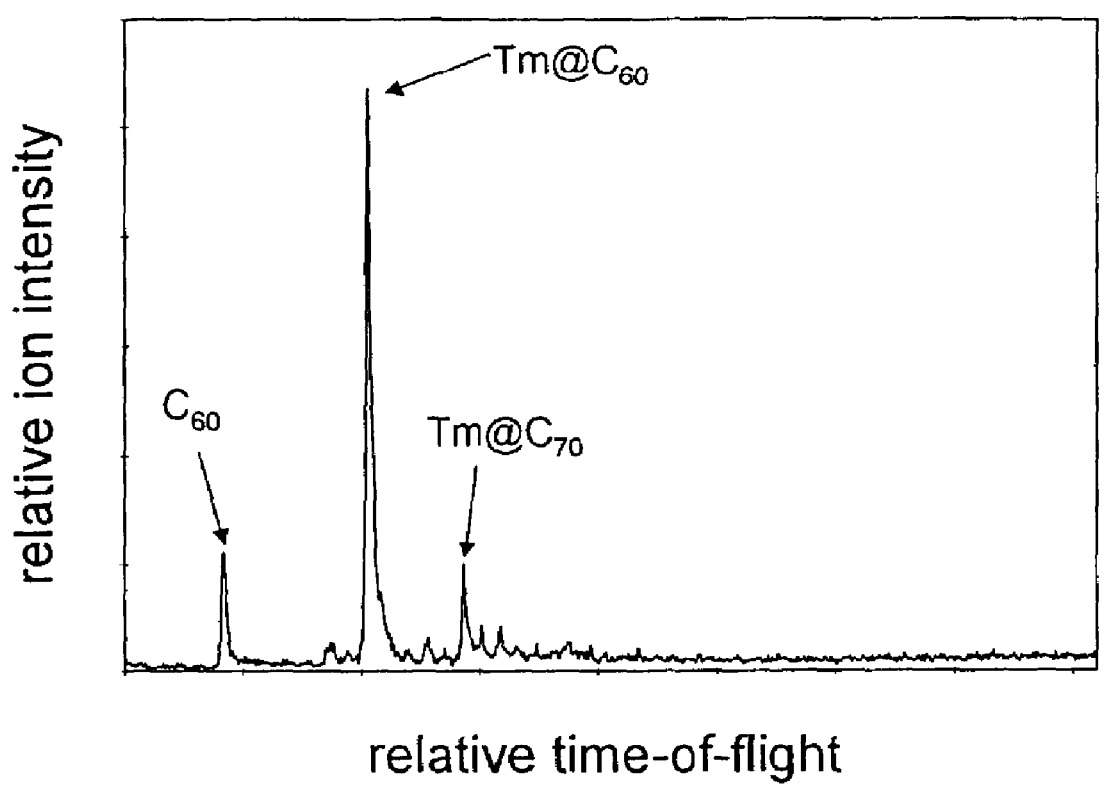
FIG. 13 shows a LD-TOF MS of mixed Tm-endohedral fullerene sublimate.

Several lanthanide M@$C_{2n}$ (M=Sm, Eu, Tm, Yb and possibly Er) are reported to contain metals donating two electrons to the fullerene cage (i.e. as with the formalism $M^{2+}$@$C_{2n}^{2-}$). This class of endohedral metallofullerene has properties differing from corresponding trivalent-metal M@$C_{2n}$ species, including deviations from the properties of the oxidation-resistant, insoluble M@$C_{60}$ class as described above. The lanthanide endohedrals of the M$_m$@$C_{60}$ class containing divalent metals can be oxidized with the mild oxidants resulting in unprecedented, soluble M@$C_{60}^+$ cations. Tm@$C_{60}$ is presented here as an example of this type of metallofullerene. FIG. 13 shows the LD-TOF MS of anaerobically produced Tm@$C_{2n}$-containing fullerene sublimate (also containing empty fullerenes) produced by the standard arc method.

Figure 14:
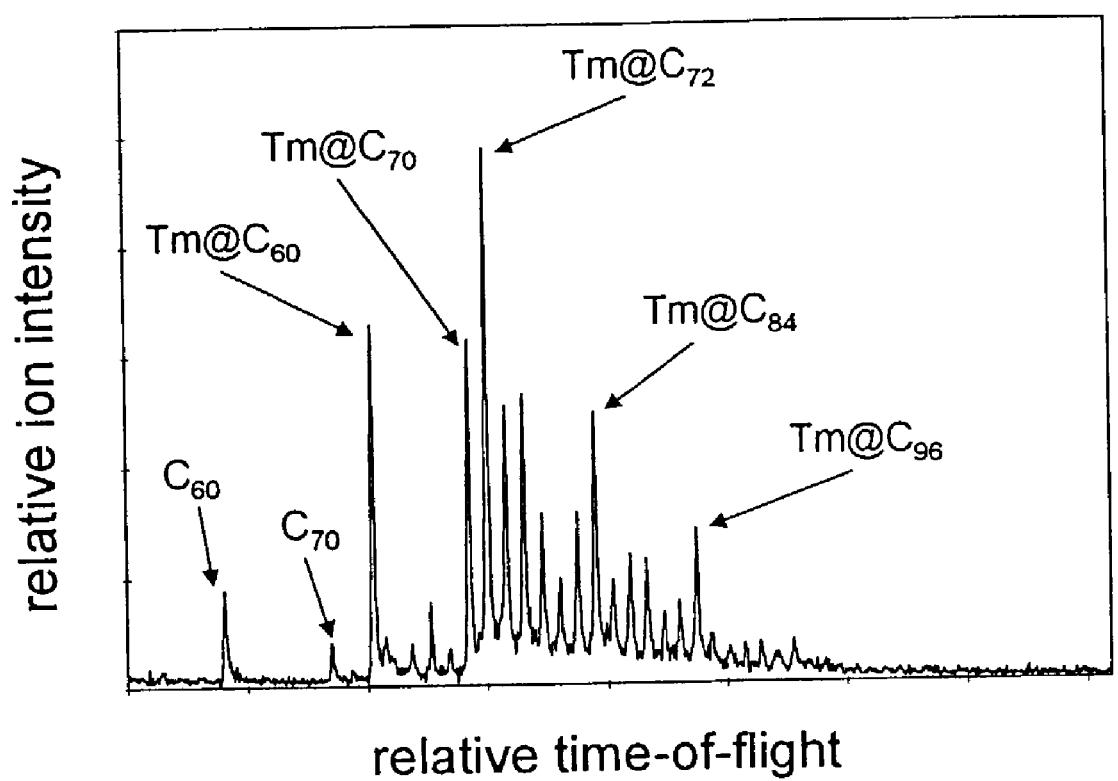
FIG. 14 shows a LD-TOF MS of purified $Tm_m@C_{2n}^+$ separated as soluble cations from insoluble endohedrals and empty $C_{2n}$ fullerenes.

This sublimate material is subjected to an oxidative extraction process similar to that shown in Scheme 2. In this first example, the process is started with reaction of the sublimate in dichloromethane with $AgPF_6$ without prior ODCB or other solvent washing. FIG. 14 shows the Tm$_m$@$C_{2n}^+$ containing material obtained from this process analogous to Scheme 2. This material includes significant amounts of Tm@$C_{60}$ and Tm@$C_{70}$ along with other Tm$_m$@$C_{2n}$ species soluble as cations. The Tm$_m$@$C_{2n}$ endohedral fullerenes are enriched relative to empty $C_{2n}$ as compared to the source sublimate. These results demonstrate that the disclosed purification processes apply to endohedral fullerenes with fundamentally different electronic structures than those of the $M^{3+}$@$C_{2n}^{3-}$ variety.

Figure 15:
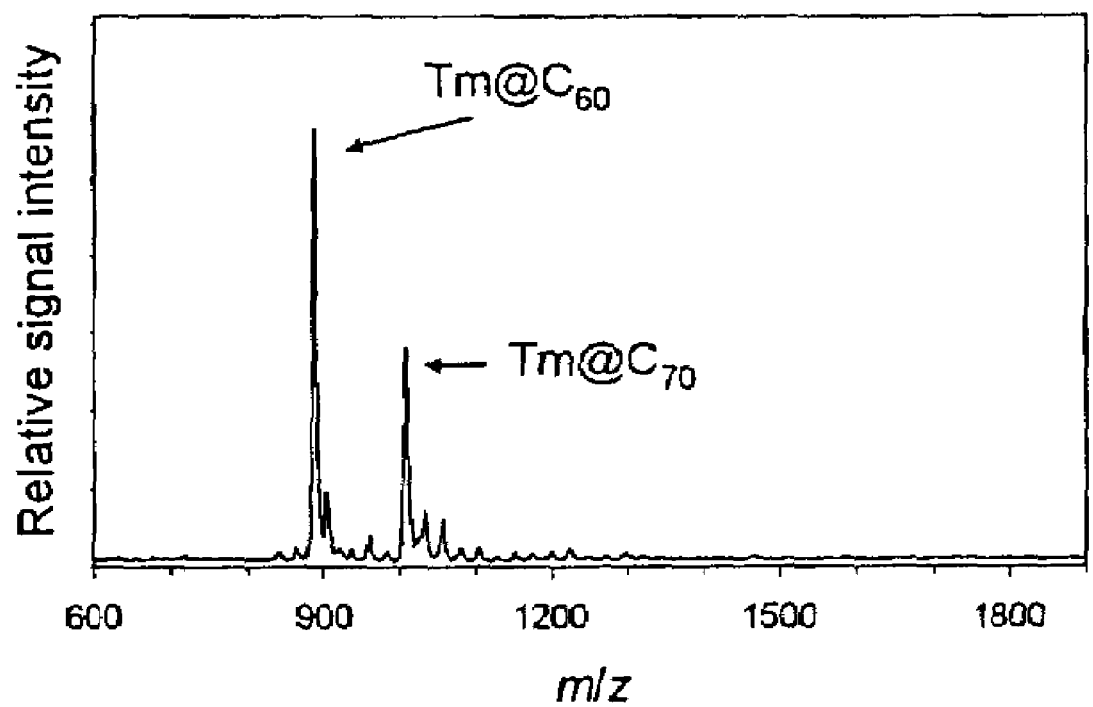
FIG. 15 shows a LD-TOF mass spectrum of the soluble oxidizable $Tm@C_{60}$ class.

More preferably, the Tm@$C_{2n}$ containing arc-sublimate material in FIG. 13 is first pre-extracted by stirring in ODCB for several days. This removes most soluble $C_{2n}$ and Tm@$C_{2n}$, etc., after which the insolubles are filtered off and rinsed with hexane. The resulting solid material is then treated with the excess oxidant $AgPF_6$ in ODCB for 12 hours. This produces a dark brown solution containing soluble cationic Tm@$C_{2n}$ species, including Tm@$C_{60}^+$ and Tm@$C_{70}^+$. The dark brown solution is filtered with a 0.45 µm PTFE filter and added dropwise to stirring hexanes, inducing immediate precipitation of the solid product. This precipitate containing Tm@$C_{60}^+$ and Tm@$C_{70}^+$ is collected by filtration, rinsed with hexanes and dried under reduced pressure producing the material shown in FIG. 15. We note that the oxidation dissolves only a portion of the ODCB-insoluble Tm@$C_{2n}^-$; possibly there are different Tm@$C_{2n}$ structures with higher oxidation potentials and/or the intramolecular polymerization of these materials is simply more difficult to surmount.

Optionally, the arc-produced soot can be used in the above process directly, without prior sublimation. Soluble Tm@$C_{2n}$ cationic species can be extracted from ODCB-washed anaerobically handled soot by oxidation with $AgPF_6$, etc. and recrystallized as described above.

The natures of the metallofullerene oxidations of the easily oxidizable Tm@$C_{2n}$ class are of particular interest. Among trivalent metal containing M@$C_{2n}$, the first oxidations result from the removal of the unpaired cage electron, as first proposed for M@$C_{82}$, with the different cage sizes (and structures) controlling the various oxidation potentials. The first oxidation of the divalent metal containing M@$C_{2n}$ may have different origins. One explanation is that the first oxidation of these M@$C_{2n}$ is metal-centered, with conversion of $M^{2+}$ to $M^{3+}$ independent of the fullerene cage. There may be a continuum of effects in this regard across the series of endohedral lanthanides and other endohedral elements inside of fullerene cages.

Scheme 3

Endohedral Metallofullerene Purification Scheme $C_{2n}$ and M@$C_{2n}$ containing arc-produced soot

Sublimation at 750° C.

Anaerobically collected fullerene sublimate

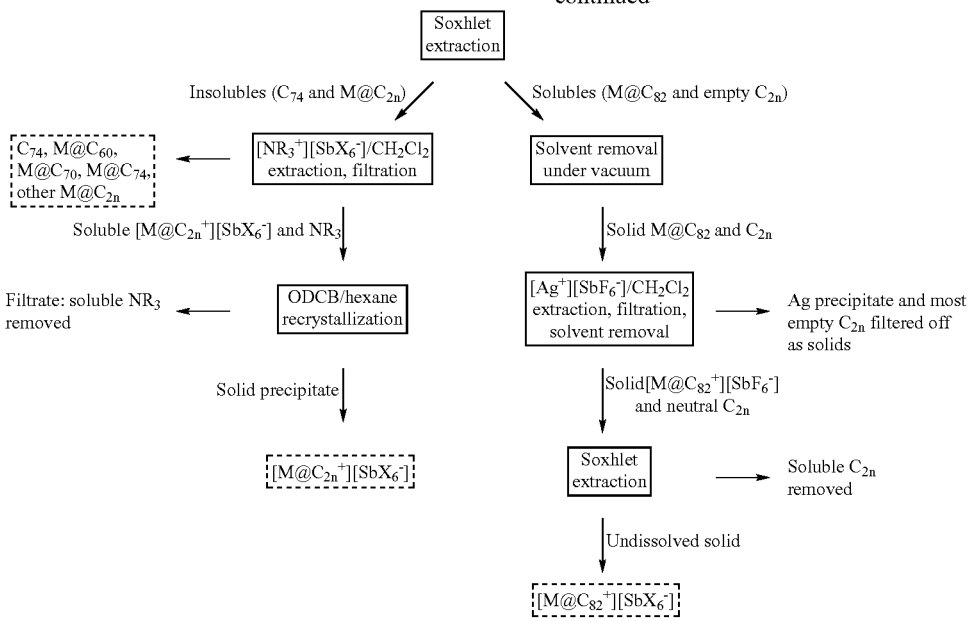

REFERENCES

Akasaka, T.; Wakahara, T.; Nagase, S.; Kobayashi, K.; Waelchli, M.; Yamamoto, K.; Kondo, M.; Shirakura, S.; Okubo, S.; Maeda, Y.; Kato, T.; Kako, M.; Nakadaira, Y.; Nagahata, R.; Gao, X.; Van Caemelbecke, E.; Kadish, K. M. (2000)(a). "La@$C_{82}$ Anion. An Unusually Stable Metallofullerene," *J. Am. Chem. Soc.*, 122, 9316–9317.

Akasaka, T.; Okubo, S.; Kondo, M.; Maeda, Y.; Wakahara, T.; Kato, T.; Suzuki, T.; Yamamoto, K.; Kobayashi, K.; Nagase, S. (2000)(b). "Isolation and characterization of two Pr@$C_{82}$ isomers", *Chem. Phys. Lett.* 319, 153–156.

Akasaka, T.; Wakahara, T.; Nagase, S.; Kobayashi, K.; Waelchli, M.; Yamamoto, K.; Kondo, M.; Shirakura, S.; Maeda, Y.; Kato, T.; Kako, M.; Nakadaira, Y.; Gao, X.; Van Caemelbecke, E.; Kadish, K. M. (2001). "Structural Determination of the La@$C_{82}$ Isomer," *J. Phys. Chem. B.*, 105, 2971–2974.

Anderson, M. R.; Dorn, H. C.; Stevenson, S.; Burbank, P. M.; Gibson, J. R. (1997). "The Voltammetry of $Sc_3$@$C_{82}$", *J. Am. Chem. Soc.* 119, 437–438.

Bethune, D. S.; Johnson, R. D.; Salem, J. R.; de Vries, M. S.; Yannoni, C. S. (1993). "Atoms in carbon cages: the structure and properties of endohedral fullerenes", *Nature* 366, 123–128.

Bolskar, R. D.; Mathur, R. S.; Reed, C. A. (1996). "Synthesis and Isolation of a Fullerene Carbocation ($C_{76}^+$)", *J. Am. Chem. Soc.* 118, 13093–13094.

Bolskar, R. D. (1997). "The Synthesis and Characterization of Fullerene Anion and Cation Salts", Ph.D. Dissertation, University of Southern California, Los Angeles, Calif.

Boudon, C.; Gisselbrecht, J.-P.; Gross, M.; Herrmann, A.; Rutimann, M.; Crassous, J.; Cardullo, F.; Echegoyen, L.; Diederich, F. (1998). "Redox Characteristics of Covalent Derivatives of the Higher Fullerenes $C_{70}$, $C_{76}$, and $C_{78}$", *J. Am. Chem. Soc.* 120, 7860–7868.

Cagle, D. W.; Kennel, S. J.; Mirzadeh, S.; Alford, J. M.; Wilson, L. J. (1999). "In vivo studies of fullerene-based materials using endohedral metallofullerene radiotracers", *Proc. Natl. Acad. Sci. USA* 96, 5182–5187.

Connelly, N. G.; Geiger, W. E. (1996). "Chemical Redox Agents for Organometallic Chemistry," *Chem. Rev.*, 96, 877–910.

Diener, M. D.; Smith, C. A.; Veirs, K. D. (1997). "Anaerobic Preparation and Solvent-Free Separation of Uranium Endohedral Metallofullerenes", *Chem. Mater.* 9, 1773–1777.

Diener, M. D.; Alford, J. M. (1998). "Isolation and properties of small-bandgap fullerenes" *Nature* 393, 668–671.

Kikuchi, K.; Suzuki, S.; Nakao, Y.; Nakahara, N.; Wakabayashi, T.; Shiromaru, H.; Satio, K.; Ikemoto, I.; Achiba, Y. (1993). "Isolation and characterization of the metallofullerene La$C_{82}$", *Chem. Phys. Lett.* 216, 67–71.

Kitagawa, T.; Sakamoto, H.; Takeuchi, K. (1999). "Electrophilic Addition of Polychloroalkanes to $C_{60}$: Direct Observation of Alkylfullerenyl Cation Intermediates", *J. Am. Chem. Soc.* 121, 4298–4299.

Kratschmer, W.; Lamb, L. D.; Fostiropoulos, K.; Huffman, D. R. (1990). "Solid $C_{60}$: a new form of carbon", *Nature* 347, 354–358.

Liu, S.; Sun, S. (2000). "Recent progress in the studies of endohedral metallofullerenes", *J. Organomet. Chem.* 599, 74–86.

Nagase, S.; Kobayashi, K.; Akasaka, T. (1996). "Endohedral Metallofullerenes: New Spherical Cage Molecules with Interesting Properties", *Bull. Chem. Soc. Jpn.* 69, 2131–2142.

Okazaki, T.; Lian, Y.; Gu, Z.; Suenaga, K.; Shinohara, H. (2000). "Isolation and spectroscopic characterization of Sm-containing metallofullerenes", *Chem. Phys. Lett.* 320, 435–440.

Reed, C. A. (1998). "Carboranes: A New Class of Weakly Coordinating Anions for Strong Electrophiles, Oxidants, and Superacids", *Acc. Chem. Res.* 31, 133–139. Reed, C. A.; Bolskar, R. D. (2000)(a). "Discrete Fulleride Anions and Fullerenium Cations", *Chem. Rev.* 100, 1075–1120.

Reed, C. A.; Kim, K.-C.; Bolskar, R. D.; Mueller, L. J. (2000)(b). "Taming Superacids: Stabilization of the Fullerene Cations $HC_{60}^+$ and $C_{60}^{+}$", *Science*, 289, 101–104.

Ruoff, R. S.; Tse, D. S.; Malhotra, R.; Lorents, D. C. (1993). "Solubility of $C_{60}$ in a Variety of Solvents", *J. Phys. Chem.* 97, 3379–3383.

Selegue, J. P.; Shaw, J. P.; Guarr, T. F.; Meier, M. S. (1994) in *Recent Advances in the Chemistry and Physics of Fullerenes and Related Materials*; Kadish, K. M.; Ruoff, R. S., Eds.; The Electrochemical Society Inc., Pennington, N.J., USA, 1274–1291.

Shinohara, H.; Yamaguchi, H.; Hayashi, N.; Sato, H.; Ohkohchi, M.; Ando, Y.; Saito, Y. (1993). "Isolation and Spectroscopic Properties of $Sc_2@C_{74}$, $Sc_2@C_{82}$, and $Sc_2@C_{84}$", *J. Phys. Chem.* 97, 4259–4261.

Shinohara (2000)) "Endohedral metallofullerenes," *Rep. Prog. Phys.* 63, 843–892.

Stevenson, S.; Rice, G.; Glass, T.; Harich, K.; Cromer, F.; Jordan, M. R.; Craft, J.; Hadju, E.; Bible, R.; Olmstead, M. M.; Maitra, K.; Fisher, A. J.; Balch, A. L.; Dorn, H. C. (1999). "Small-bandgap endohedral metallofullerenes in high yield and purity", *Nature* 401, 55–57.

Strauss, S. H. (1993). "The Search for Larger and More Weakly Coordinating Anions", *Chem. Rev.* 93, 927–942.

Sun, D.; Huang, H.; Yang, S.; Liu, Z.; Liu, S. (1999). "A Simple Method for the Selective Enrichment of Endohedral Metallofullerenes", *Chem. Mater.* 11, 374–377.

Suzuki, T.; Maruyama, Y.; Kato, T.; Kikuchi, K.; Nakao, Y.; Achiba, Y.; Kobayashi, K.; Nagase, S. (1995). "Electrochemistry and Ab Initio Study of the Dimetallofullerene $La_2@C_{80}$", *Angew. Chem. Int. Ed. Engl.* 34, 1094–1096.

Suzuki, T.; Kikuchi, K.; Oguri, F.; Nakao, Y.; Suzuki, S.; Achiba, Y.; Yamamoto, K.; Funasaka, H.; Takahashi, T. (1996). "Electrochemical Properties of Fullernolanthanides", *Tetrahedron* 52, 4973–4982.

Tso, T. S. C. ; Wan, T. S. M.; Zhang, H.-W.; Kwong, K.-P.; Wong, T.; Shinohara, H.; Inakuma, M. (1996). "Solid Phase Extraction as a Simple Method for the Enrichment of Endohedral Metallofullerenes", *Tetrahedron Lett.* 37, 9249–9252.

Tumanskii, B. L.; Bashilov, V. V.; Solodovnikov, S. P.; Sokolov, V. I.; Bubnov, V. P.; Laukhina, E. E.; Estrin, Y. I.; Kol'tover, V. K.; Yagubskii, E. B. (1998). "EPR Study of Reactivity of Endohedral Metallofullerenes $La@C_{82}$ and $Y@C_{82}$", *Full. Sci. and Tech.* 6, 445–451.

Xiao, J.; Savina, M. R.; Martin, G. B.; Francis, A. H.; Meyerhoff, M. E. (1994). "Efficient HPLC Purification of Endohedral Metallofullerenes on a Porphyrin-Silica Stationary Phase", *J. Am. Chem. Soc.* 116, 9341–9342.

Xie, Q.; Perez-Cordero, E.; Echegoyen, L. (1992). "Electrochemical Detection of $C_{60}^{6-}$ and $C_{70}^{6-}$: Enhanced Stability of Fullerides in Solution", *J. Am. Chem. Soc.* 114, 3978–3980.

Xie, Q.; Arias, F.; Echegoyen, L. (1993). "Electrochemically-Reversible, Single-Electron Oxidation of $C_{60}$ and $C_{70}$", *J. Am. Chem. Soc.* 115, 9818–9819.

Yamamoto, K.; Funasaka, H.; Takahashi, T.; Akasaka, T. (1994). "Isolation of an ESR-Active Metallofullerene of $La@C_{82}$", *J. Phys. Chem.* 98, 2008–2011.

Yang, Y.; Arias, F.; Echegoyen, L.; Chibante, L. P. F.; Flanagan, S.; Robertson, A.; Wilson, L. J. (1995). "Reversible Fullerene Electrochemistry: Correlation with the HOMO-LUMO Energy Difference for $C_{60}$, $C_{70}$, $C_{76}$, $C_{78}$, and $C_{84}$", *J. Am. Chem. Soc.* 117, 7801–7804.

Yeretzian, C.; Wiley, J. B.; Holczer, K.; Su, T.; Nguyen, S.; Kaner, R. B.; Whetten, R. L. (1993). "Partial Separation of Fullerenes by Gradient Sublimation", *J. Phys. Chem.* 97, 10097–10101.

All references cited herein are incorporated by reference herein to the extent that they are not inconsistent with the disclosures herein and as if each individual reference had been specifically incorporated by reference.

Those of ordinary skill in the art will appreciate that reagents, starting materials, solvents, reaction conditions (e.g., temperatures, pressures, etc.), purification methods, and analytical techniques and other methods and procedures other than those specifically disclosed herein can be applied to the practice of this invention without resort to undue experimentation. All such methods, reagents, starting materials and conditions are intended to be encompassed within the scope of this invention. Those of ordinary skill in the art will be aware of a number of methods, reagents, materials, procedures and techniques that are functionally equivalent to the methods, reagents, materials, procedures and techniques that are disclosed and/or described herein. All such functional equivalents are intended to be encompassed by the scope of this invention.

Applicants note that the instant invention is particularly useful for purifying fullerenes for derivatization and solubilization as disclosed in concurrently filed U.S. patent application entitled "Derivatization and Solubilization of Insoluble Classes of Fullerenes," application Ser. No. 10/263,375 and provisional patent applications Nos. 60/326,353 and 60/371,380.

We claim:

1. A method of separating a first and a second fullerene in a fullerene material comprising the steps of:
   (a) introducing the fullerene material into a solvent;
   (b) forming a stable fullerene cation from the first fullerene, wherein the solvent is selected so that at least one of the fullerene cation or the second fullerene is soluble therein; and
   (c) separating the fullerene cation or a salt thereof from the second fullerene,
   wherein the stable fullerene cation is formed using an electrode in an electrolyte solution.

2. A method of separating a first and a second fullerene in a fullerene material comprising the steps of:
   (a) introducing the fullerene material into a solvent;
   (b) forming a stable fullerene cation from the first fullerene, wherein the solvent is selected so that at least one of the fullerene cation of the first fullerene or the second fullerene is soluble therein; and
   (c) separating the fullerene cation or a salt thereof from the second fullerene,
   wherein the fullerene cation or a salt thereof is separated from the second fullerene based on a difference in solubility between the fullerene cation or salt and the second fullerene.

3. The method of claim 2 wherein the stable fullerene cation is formed using a chemical oxidizing agent.

4. The method of claim 2 wherein the stable fullerene cation is formed using a protonation agent.

5. The method of claim 2, wherein the stable fullerene cation is formed using an electrophilic agent which is not a protonation agent.

6. The method of claim 2, wherein the oxidation potential of the first and second fullerene differ by at least about 0.10 V using the ferrocene standard.

7. The method of claim 2, wherein the oxidation potential of the first and second fullerene differ by at least about 0.30 V using the ferrocene standard.

8. The method of claim 2, wherein the stable fullerene cation is formed from endohedral fullerenes, higher fullerenes, endohedral metallofullerenes, or mixtures thereof.

9. The method of claim 2, wherein the second fullerene and the fullerene cation are both substantially soluble in the solvent and the fullerene cation is separated from the second fullerene by decreasing the polarity of the solvent to precipitate a salt of the fullerene cation and separating the fullerene cation salt precipitate from the solvent.

10. The method of claim 9 wherein the first fullerene is substantially soluble in the solvent.

11. The method of claim 9 wherein the first fullerene is substantially insoluble in the solvent.

12. The method of claim 2, wherein the first and second fullerene are substantially soluble in the solvent, the fullerene cation is substantially insoluble in the solvent, and the fullerene cation is separated from the second fullerene by precipitating a salt of the fullerene cation and separating the fullerene cation salt precipitate from the solvent.

13. The method of claim 2, wherein the first and second fullerene are substantially insoluble in the solvent, the fullerene cation is substantially soluble in the solvent, and the fullerene cation is separated from the second fullerene by separating the insoluble second fullerene from the solvent.

14. The method of claim 2 further comprising step (d) returning the fullerene cation to its original charge state.

15. The method claim 2, further comprising step (d) reducing the fullerene cation with a reducing agent.

16. The method of claim 2 wherein the fullerene material is extracted, sublimed or both prior to introduction into the solvent.

17. A method of separating a first and a second fullerene in a fullerene material comprising the steps of:
    (a) introducing the fullerene material into a solvent;
    (b) forming a stable fullerene cation from the first fullerene, wherein the solvent is selected so that at least one of the fullerene cation or the second fullerene is soluble therein; and
    (c) separating the fullerene cation or a salt thereof from the second fullerene,
wherein the stable fullerene cation is formed from a small bandgap fullerene.

18. A method of separating a first and a second fullerene in a fullerene material comprising the steps of:
    (a) introducing the fullerene material into a solvent;
    (b) forming a stable fullerene cation from the first fullerene, wherein the solvent is selected so that at least one of the fullerene cation or the second fullerene is soluble therein; and
    (c) separating the fullerene cation or a salt thereof from the second fullerene,
wherein the stable fullerene cation is formed from an endohedral metallofullerene containing a metal selected from the group consisting of the lanthanide, transition, alkali, alkaline earth, and actinide metals.

19. The method of claim 18, wherein the metal is selected from the group consisting of Sc, Y, La, Sm, Eu, Tm, Yb, Ce, Pr, Nd, Gd, Tb, Dy, Ho, Lu, and Er.

20. The method of claim 19, wherein the metal is Gd, La, or Y.

21. A method of separating a first and a second fullerene in a fullerene material comorisinci the steps of:
    (a) introducing the fullerene material into a solvent;
    (b) forming a stable fullerene cation from the first fullerene, wherein the solvent is selected so that at least one of the fullerene cation or the second fullerene is soluble therein; and
    (c) separating the fullerene cation or a salt thereof from the second fullerene,
wherein the stable fullerene cation is formed from an endohedral fullerene containing an element selected from the group consisting of radioactive elements.

22. A method of purifying a selected fullerene from a fullerene material containing the selected fullerene and an undesired fullerene comprising the steps of:
    (a) introducing the fullerene material into a solvent;
    (b) forming a stable fullerene cation from one of the selected fullerene or the undesired fullerene;
    (c) decreasing the polarity of the solvent to precipitate a salt of the fullerene cation; and
    (d) separating the solvent from the precipitated fullerene cation salt.

23. The method of claim 22, wherein the fullerene cation is formed by oxidizing the selected fullerene.

24. The method of claim 22, wherein the fullerene cation is formed by oxidizing the undesired fullerene.

25. The method of claim 22 wherein the fullerene cation is formed using a protonation agent.

26. The method of claim 22 wherein the fullerene cation is formed using an electrophilic agent which is not a protonation agent.

27. The method of claim 22 wherein the selected fullerene is a small band gap fullerene.

28. The method of claim 22 wherein the selected fullerene is an endohedral fullerene or a metalloendohedral fullerene.

29. The method of claim 28 wherein the selected fullerene is an endohedral metallofuillerene which contains a metal selected from the group consisting of Sc, Y, La, Sm, Eu, Tm, Yb, Ce, Pr, Nd, Gd, Tb, Dy, Ho, Lu and Er.

30. The method of claim 29 wherein the metal is Gd, La or Y.

31. The method of claim 28 wherein the endohedral metallofullerene contains a radioactive element.

32. The method of claim 22 wherein the stable fullerene cation is formed using a chemical oxidizing agent.

33. The method of claim 22 further comprising step (e) returning the fullerene cation to its original charge state.

34. The method of claim 22 wherein the fullerene material is extracted, sublimed or both prior to introduction into the solvent.

35. A method for separating $C_{60}$ and $C_{70}$ fullerenes from a fullerene material containing a first fullerene and $C_{60}$ and $C_{70}$ fullerenes comprising the steps of:
    (a) introducing the fullerene material into a solvent;
    (b) forming a stable fullerene cation from the first fullerene, wherein the fullerene cation and the $C_{60}$ and $C_{70}$ fullerenes are all soluble in the solvent;
    (c) decreasing the polarity of the solvent to precipitate a salt of the fullerene cation; and
    (d) separating the solvent containing the $C_{60}$ and $C_{70}$ fullerenes from the fullerene cation salt precipitate.

36. A method for preparing an endohedral fullerene substantially free of $C_{60}$ and $C_{70}$ fullerenes comprising the steps of:
    (a) introducing the fullerene material into a solvent, the fullerene material containing $C_{60}$ and $C_{70}$ fullerenes and an endohedral fullerene;

(b) forming a stable fullerene cation from the endohedral fullerene wherein the endohedral fullerene cation and the $C_{60}$ and $C_{70}$ fullerenes are all soluble in the solvent;
(c) decreasing the polarity of the solvent to precipitate a salt of the endohedral fullerene cation; and
(d) separating the solvent containing the $C_{60}$ and $C_{70}$ fullerenes from the endohedral fullerene cation salt.

* * * * *